US008360343B2

(12) United States Patent
Gudat et al.

(10) Patent No.: US 8,360,343 B2

(45) Date of Patent: Jan. 29, 2013

(54) METHODS AND SYSTEMS FOR EXECUTING FLUID DELIVERY MISSION

(75) Inventors: Adam J. Gudat, Chillicothe, IL (US); James D. Humphrey, Decatur, IL (US); Peter W. Anderton, Peoria, IL (US); David C. Orr, Dunlap, IL (US); Kenneth L. Stratton, Dunlap, IL (US); Craig L. Koehrsen, East Peoria, IL (US); Claude W. Keefer, Elmwood, IL (US); Michael D. Braunstein, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 234 days.

(21) Appl. No.: 12/772,060

(22) Filed: Apr. 30, 2010

(65) Prior Publication Data

US 2011/0266360 A1 Nov. 3, 2011

(51) Int. Cl.
*A01G 25/09* (2006.01)

(52) U.S. Cl. ............................ 239/172; 239/69; 239/74

(58) Field of Classification Search .................... 169/46, 169/47, 53; 239/67–74, 172

See application file for complete search history.

(56) References Cited

U.S. PATENT DOCUMENTS 3,100,083 A 8/1963 Wardrup
3,344,993 A 10/1967 Wilder et al.
3,529,772 A 9/1970 Brodersen
3,552,658 A 1/1971 Sons
3,782,634 A 1/1974 Herman
3,853,272 A 12/1974 Decker et al.
4,167,247 A 9/1979 Sons et al.
4,380,353 A 4/1983 Campbell et al.
4,487,615 A 12/1984 Taylor et al.
4,803,626 A 2/1989 Bachman et al.
4,817,870 A 4/1989 Dalton
5,134,961 A 8/1992 Giles et al.
(Continued)

FOREIGN PATENT DOCUMENTS

JP 2001-303526 10/2001
JP 4107465 B2 4/2008
(Continued)

OTHER PUBLICATIONS

Mine Inspectorate, Queensland Government, "Excessive Watering of Haul-Roads," Safety Bulletin 94, Jan. 22, 2010.

(Continued)

*Primary Examiner* — Christopher Kim

(74) *Attorney, Agent, or Firm* — Finnegan, Henderson, Farabow, Garrett & Dunner, LLP

(57) ABSTRACT

A mobile fluid delivery machine for delivering fluid to a site has a tank storing fluid, and at least one spray head configured to spray the stored fluid onto the site. In addition, the machine has a communication device configured to receive fluid delivery mission instructions from a site computing system, the mission instructions identifying a sequence of path segments on the site and corresponding fluid delivery amounts allocated to the path segments, and a location device configured to determine the location of the machine on the site. Th machine may also have a fluid delivery system configured to determine whether the location of the fluid delivery machine corresponds to a path segment of the sequence, and when it is determined that the location of the machine corresponds to a path segment in the sequence, to identify the fluid delivery amount allocated to that path segment based on the mission instructions.

8 Claims, 13 Drawing Sheets

U.S. PATENT DOCUMENTS

| | | | | |
|---|---|---|---|---|
| 5,278,423 | A | 1/1994 | Wangler et al. | |
| 5,518,299 | A | 5/1996 | Adamczyk et al. | |
| 5,667,336 | A | 9/1997 | Zur | |
| 5,768,823 | A | 6/1998 | Nelson | |
| 5,802,492 | A | 9/1998 | Delorme et al. | |
| 5,837,997 | A | 11/1998 | Beck et al. | |
| 5,911,362 | A | 6/1999 | Wood et al. | |
| 5,911,363 | A | 6/1999 | Oligschlager | |
| 5,964,410 | A | 10/1999 | Brown et al. | |
| 6,167,337 | A | 12/2000 | Haack et al. | |
| 6,209,257 | B1 | 4/2001 | Nishimura | |
| 6,444,975 | B1 | 9/2002 | Reusch | |
| 6,669,105 | B2 * | 12/2003 | Bryan et al. | 239/61 |
| 6,877,675 | B2 | 4/2005 | Benneweis | |
| 6,941,199 | B1 | 9/2005 | Bottomley et al. | |
| 6,954,719 | B2 | 10/2005 | Carter, Jr. et al. | |
| 7,001,444 | B2 | 2/2006 | Small | |
| 7,024,285 | B2 | 4/2006 | Saelens | |
| 7,108,196 | B2 | 9/2006 | Kime | |
| 7,166,841 | B2 | 1/2007 | Satou et al. | |
| 7,182,278 | B2 | 2/2007 | Haviland et al. | |
| 7,263,210 | B2 | 8/2007 | Kummel | |
| 7,337,156 | B2 * | 2/2008 | Wippich | 706/44 |
| 7,388,662 | B2 | 6/2008 | Cantin et al. | |
| 7,503,510 | B2 * | 3/2009 | Vickers et al. | 239/69 |
| 7,717,353 | B2 * | 5/2010 | Matulis | 239/1 |
| 7,839,301 | B2 | 11/2010 | Doherty et al. | |
| 7,857,237 | B2 * | 12/2010 | Vickers et al. | 239/69 |
| 2004/0195357 | A1 | 10/2004 | Doherty et al. | |
| 2005/0060127 | A1 | 3/2005 | Carter, Jr. et al. | |
| 2005/0204587 | A1 | 9/2005 | Kime | |
| 2006/0273189 | A1 | 12/2006 | Grimm et al. | |
| 2007/0125558 | A1 | 6/2007 | Embry | |
| 2007/0129849 | A1 | 6/2007 | Zini et al. | |
| 2007/0138315 | A1 | 6/2007 | Earle et al. | |
| 2008/0087305 | A1 | 4/2008 | Cotter | |
| 2008/0275590 | A1 | 11/2008 | Ross | |
| 2009/0018784 | A1 | 1/2009 | Dintino et al. | |
| 2009/0047730 | A1 | 2/2009 | Higgins et al. | |
| 2009/0090890 | A1 | 4/2009 | Nguyen | |
| 2009/0224084 | A1 | 9/2009 | Hoisington et al. | |
| 2010/0063673 | A1 | 3/2010 | Anderson | |
| 2010/0301127 | A1 | 12/2010 | Anderton et al. | |
| 2011/0095094 | A1 | 4/2011 | Stevens et al. | |
| 2011/0160919 | A1 | 6/2011 | Orr et al. | |
| 2011/0160920 | A1 | 6/2011 | Orr et al. | |
| 2011/0266360 | A1 | 11/2011 | Gudat et al. | |
| 2011/0288769 | A1 | 11/2011 | Gudat et al. | |

FOREIGN PATENT DOCUMENTS

| | | |
|---|---|---|
| KR | 10-0806486 | 2/2008 |
| KR | 10-0883086 | 2/2009 |

OTHER PUBLICATIONS http://www.hydeneng.com.au/templates/hyden_contest.aspx?pageID=3928, “Enviro-spray™ Water Truck Systems,” (2007) (1 page).

Anderton et al., “Fluid Delivery System and Method,” Copending U.S. Appl. No. 13/468,608, filed May 10, 2012 (29 pages).

Tsai et al., *An Investigation of Dust Emissions from Unpaved Surfaces in Taiwan*, Separation and Purification Technology, 2002 (8 pages).

* cited by examiner

600

| 602 MACHINE ID | 604 MACHINE LOCATION | 606 MACHINE PRIORITY | 608 FLUID LEVEL | 610 FUEL LEVEL | 612 MACHINE STATUS | 614 MISSION INFORMATION |
|---|---|---|---|---|---|---|
| ... | ... | ... | ... | ... | ... | ... |
| ... | ... | ... | ... | ... | ... | ... |
| ... | ... | ... | ... | ... | ... | ... |
| ... | ... | | | ... | | |

FIG. 6

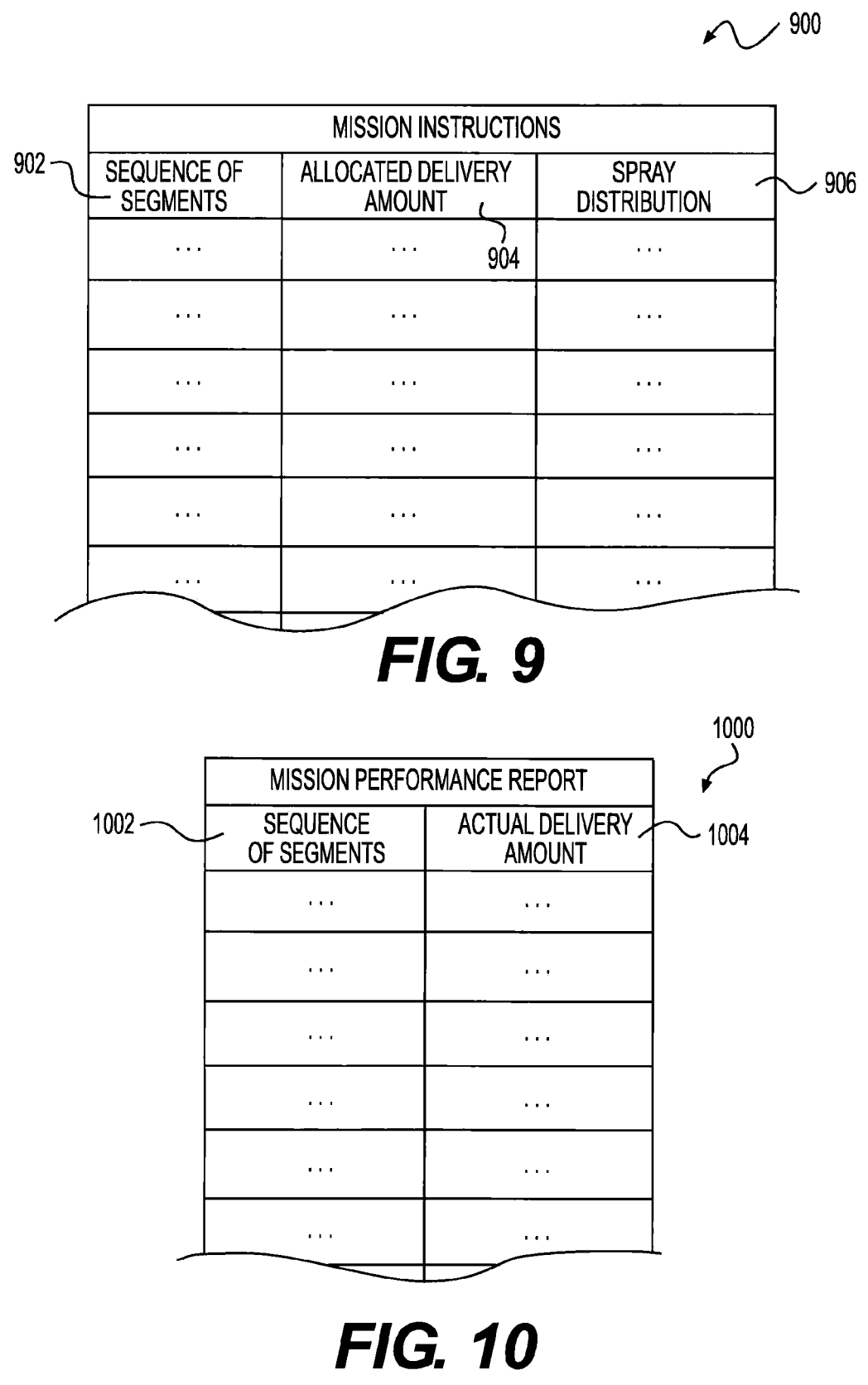

900

| MISSION INSTRUCTIONS | | |
|---|---|---|
| SEQUENCE OF SEGMENTS (902) | ALLOCATED DELIVERY AMOUNT (904) | SPRAY DISTRIBUTION (906) |
| ... | ... | ... |
| ... | ... | ... |
| ... | ... | ... |
| ... | ... | ... |
| ... | ... | ... |
| ... | ... | ... |

FIG. 9

1000

| MISSION PERFORMANCE REPORT | |
|---|---|
| SEQUENCE OF SEGMENTS (1002) | ACTUAL DELIVERY AMOUNT (1004) |
| ... | ... |
| ... | ... |
| ... | ... |
| ... | ... |
| ... | ... |
| ... | ... |

FIG. 10

METHODS AND SYSTEMS FOR EXECUTING FLUID DELIVERY MISSION

TECHNICAL FIELD

This disclosure relates generally to a system and method for fluid delivery on a site and, more particularly, to methods and systems for executing a fluid delivery mission on a site.

BACKGROUND

Work environments associated with certain industries, such as the mining and construction industries, are susceptible to undesirable dust conditions. For example, worksites associated with mining, excavation, construction, landfills, and material stockpiles may be particularly susceptible to dust due to the nature of the materials composing the worksite surface. For example, worksite surfaces of coal, shale, stone, etc., erode easily, and thus may tend to produce significant amounts of dust. Moreover, typical work operations performed at these sites only exacerbate the dust conditions. At a mine site, for example, cutting, digging, and scraping operations may break up the worksite surface and generate dust. In addition, heavy machinery, such as haul trucks, dozers, loaders, excavators, etc., traveling on such sites may disturb settled dust, thereby increasing the dust level of the air.

Undue dust conditions may reduce the efficiency of a worksite. For example, dust may impair visibility, interfere with work operations on the site, and require increased equipment maintenance and cleaning. In addition, dust may compromise the comfort, health, and safety of worksite personnel.

Various devices and methods have been used in the past to control worksite dust conditions. For example, U.S. Pat. No. 6,954,719 to Carter, Jr. et al. ("the '719 patent") discloses a method and system for treating worksite dust conditions. Specifically, the '719 patent discloses a system including one or more dust monitors positioned at different locations around the worksite. The dust monitors monitor the dust levels at their respective locations on the worksite and generate a dust control signal indicative of the monitored dust level. A controller associated with the system receives the signals from the dust monitors. When the controller determines that the dust level at the location of a particular dust monitor increases above a threshold, the controller generates a signal to dispatch a mobile dust control machine, such as a water truck, to the location. In response, the dust control machine travels to the location and treats the dust condition by spraying water at the location.

While the dust control system of the '719 patent may help control dust levels on the worksite, the system may be limited in certain ways. For example, the system of the '719 patent only takes into consideration dust levels at specific locations on the worksite, even though other factors may be relevant in the process. In addition, the system of the '719 patent makes no determination of an appropriate amount of water to spray at the locations. Moreover, the system of the '719 patent may not consider aspects relating to the coordination or planning the dispatching of the dust control machines.

This disclosure is directed to overcoming one or more disadvantages set forth above and/or other problems in the art.

SUMMARY

One aspect of the disclosure relates to a mobile fluid delivery machine for delivering fluid to a site. The mobile fluid delivery machine may include a tank storing fluid, and at least one spray head configured to spray the stored fluid onto the site. The mobile fluid delivery machine may further include a communication device configured to receive fluid delivery mission instructions from a site computing system, the mission instructions identifying a sequence of path segments on the site and corresponding fluid delivery amounts allocated to the path segments. In addition, the mobile fluid delivery machine may include a location device configured to determine the location of the mobile fluid delivery machine on the site, and a fluid delivery system. The fluid delivery system may be configured to determine whether the location of the fluid delivery machine corresponds to a path segment of the sequence, and when it is determined that the location of the fluid delivery machine corresponds to a path segment in the sequence, to identify the fluid delivery amount allocated to that path segment based on the mission instructions.

Another aspect of the disclosure relates to a method performed by mobile fluid delivery machine for delivering fluid to a site. The method may include receiving fluid delivery mission instructions from a site computing system, the mission instructions identifying a sequence of path segments on the site and corresponding fluid delivery amounts allocated to the path segments, and determining a location of the mobile fluid delivery machine on the site. In addition, the method may include determining whether the location of the fluid delivery machine corresponds to a path segment of the sequence, and when it is determined that the location of the fluid delivery machine corresponds to a path segment of the sequence, identifying the fluid delivery amount allocated to that path segment based on the mission instructions.

Another aspect of the disclosure relates to another mobile fluid delivery machine for delivering fluid to a site. The mobile fluid delivery machine may include a tank storing fluid, and at least one spray head configured to spray the stored fluid onto the site. The mobile fluid delivery machine may further include a communication device configured to receive fluid delivery mission instructions from a site computing system, the instructions identifying a sequence of path segments on the site and corresponding fluid delivery amounts allocated to the path segments. The mobile fluid delivery machine may further include a location device configured to determine a location of the mobile fluid delivery machine on the site, and a speed sensor configured to sense a travel speed of the mobile fluid delivery machine. In addition, the mobile fluid delivery machine may include a fluid delivery system configured to control a rate at which the fluid is sprayed from the at least one spray head to the path segments based on the travel speed of the mobile fluid delivery machine, the location of the mobile fluid delivery machine, and the mission instructions.

BRIEF DESCRIPTION OF THE DRAWINGS

FIG. 6 is a representation of exemplary fluid delivery machine information, consistent with the disclosed embodiments;

FIG. 9 is a representation of exemplary fluid delivery mission instructions, consistent with the disclosed embodiments;

FIG. 10 is a representation of an exemplary mission performance report, consistent with the disclosed embodiments;

DETAILED DESCRIPTION

Figure 1:
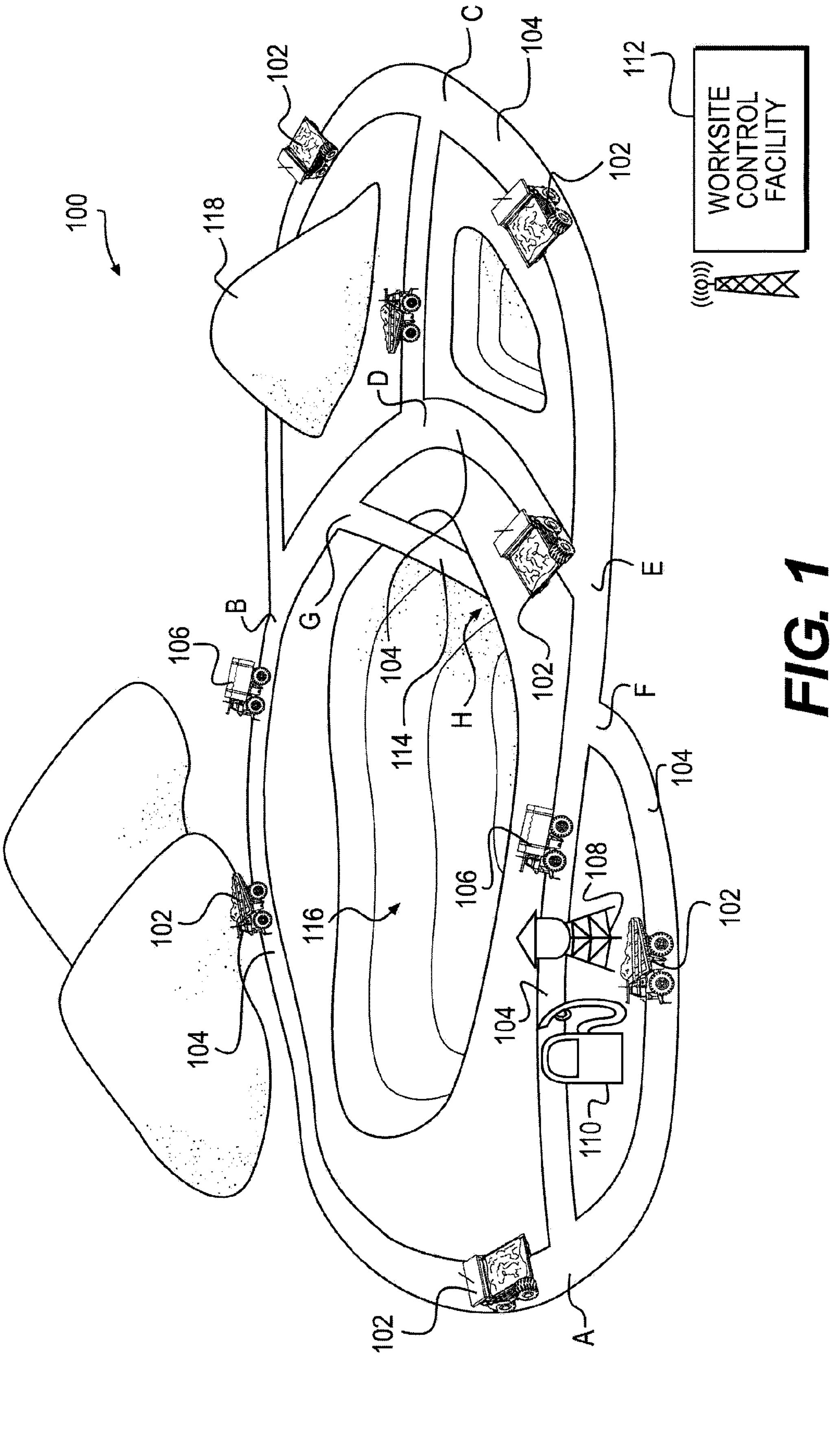
FIG. 1 is a representation of an exemplary worksite on which the disclosed fluid delivery processes may be employed, consistent with the disclosed embodiments.

FIG. 1 illustrates an exemplary worksite 100 on which the disclosed fluid delivery processes may be employed. In one environment, worksite 100 may embody a surface mine site where mining operations generate dust that creates difficult conditions for worksite personnel and equipment. For example, the dust may impair visibility, reduce air quality, require frequent equipment maintenance and cleaning, or otherwise hinder operations at worksite 100. It is to be appreciated, however, that worksite 100 may alternatively embody a construction site, a landfill, an underground mine site, or any other type of worksite at which dust conditions or other undesirable worksite surface conditions may arise. Worksite 100 may require periodic fluid delivery, such as water delivery, to treat dust conditions or to prevent dust conditions from arising on worksite 100. In other embodiments, worksite 100 may alternatively or additionally require fluid delivery to compact the soil and prepare the worksite surface for cutting, digging, scraping, excavating, or other operations.

As shown in FIG. 1, a variety of mobile machines 102 may operate on worksite 100. Mobile machines 102 may include any combination of autonomous (e.g., unmanned) machines, semi-autonomous machines, and operator-controlled machines. Mobile machines 102 may include, for example, off-highway haul trucks, articulated trucks, excavators, loaders, dozers, scrapers, or other types of earth-working machines for excavating or handling material on worksite 100. In connection with operations on worksite 100, mobile machines 102 may travel along roads 104 (e.g., haul roads) or other paths between excavation locations, dumping areas, and other destinations on worksite 100. Mobile machines 102 may also perform cutting, digging, scraping, excavating, loading, or other operations at various locations on worksite 100.

In addition, worksite 100 may include one or more mobile fluid delivery machines 106, such as a fleet of fluid delivery machines 106. Consistent with the disclosed embodiments, fluid delivery machines 106 may be dispatched on roads 104 to deliver (e.g., spray) fluid to the worksite surface to control worksite dust conditions. Alternatively or additionally, fluid delivery machines 106 may be dispatched to deliver fluid to worksite 100 to condition the surface for cutting, digging, scraping, excavating, loading, or other operations.

In one embodiment, worksite 100 may include paths on which mobile machines 102 and/or fluid delivery machines 106 may travel in connection with operations on worksite 100. As used herein, "path" refers to a stretch of road 104 between two intersections, such as intersection points A-H shown in FIG. 1. Consistent with the disclosed embodiments, fluid delivery machines 106 may be dispatched on a route including one or more paths to treat the route with fluid to control dust conditions or to condition the route for certain operations. As used herein, a "route" refers to a set of sequential paths a fluid delivery machine 106 travels while delivering fluid to the worksite surface.

Figure 2:
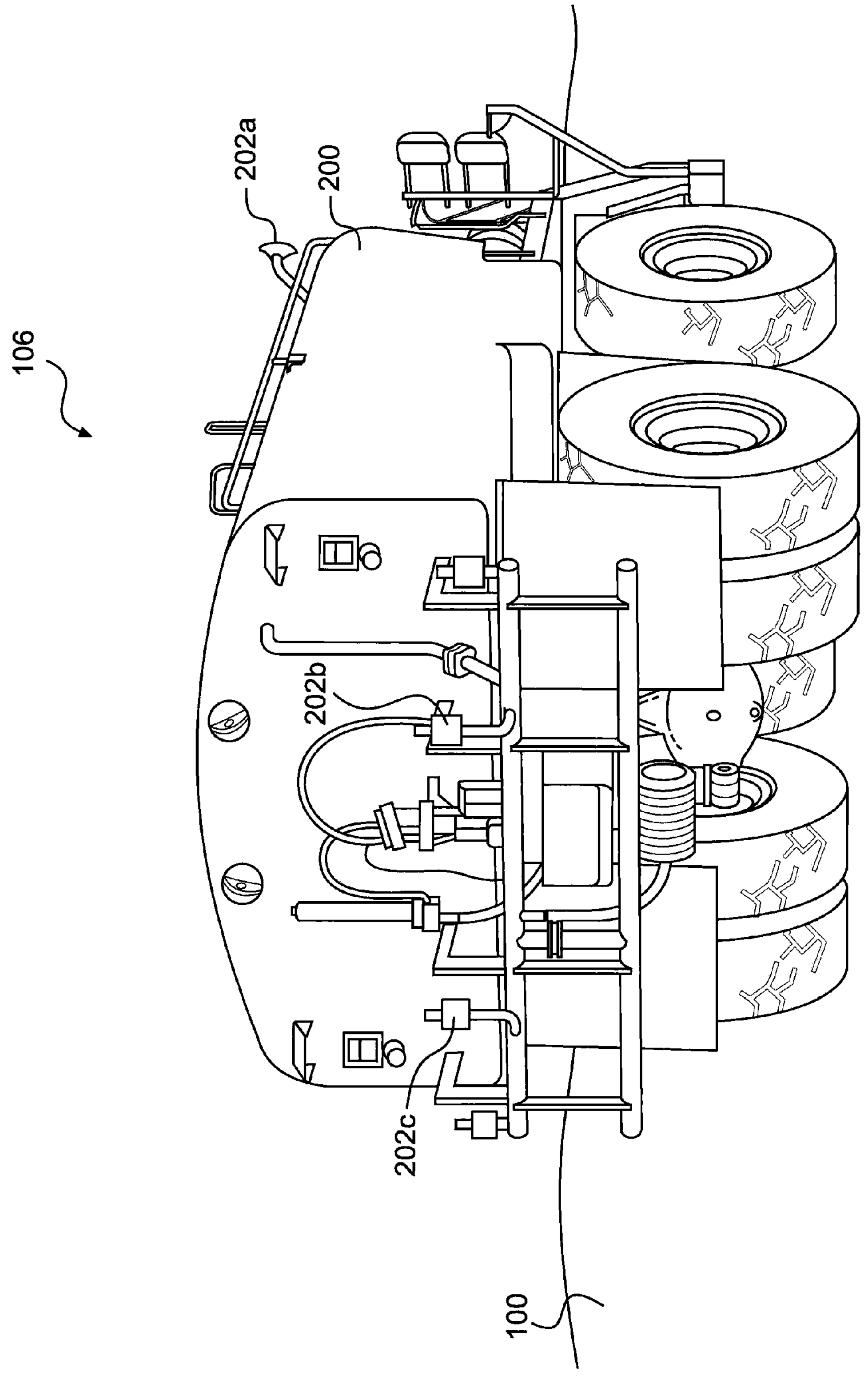
FIG. 2 is a representation of an exemplary mobile fluid delivery machine, consistent with the disclosed embodiments.

FIG. 2 illustrates an exemplary fluid delivery machine 106, consistent with the disclosed embodiments. In one embodiment, fluid delivery machine 106 may be an off-highway truck converted for fluid delivery. For example, fluid delivery machine 106 may be fitted with, among other things, a fluid tank 200 configured to store fluid, such as water, dust suppressant, and/or other fluids for mitigating dust or preparing the worksite surface for certain operations. As shown, fluid delivery machine 106 may also be fitted with an assembly of piping, hoses, pumps, valves, and/or other hydraulic elements for pumping, pressurizing, carrying, and/or transporting the fluid. In addition, fluid delivery machine 106 may be equipped with one or more spray heads 202 configured to spray the fluid stored in tank 200 onto the surface of worksite 100 during travel.

In one embodiment, spray heads 202 may be controllable by an onboard fluid delivery system to vary the spray rate, width, distribution, direction, and/or pattern in accordance with various fluid delivery parameters. For example, the spray width may be varied based on the width of the paths. The distribution and/or direction of the spray may be varied depending upon the location of objects on the worksite surface. For example, certain spray heads 202 may be turned on or off depending upon the locations of oncoming traffic, worksite personnel, work areas, etc., relative to the position and/or heading of fluid delivery machine 106. As discussed in detail below, the spray rate and/or amount may be varied depending upon a variety environmental factors, worksite usage factors, path characteristic factors, and/or other factors.

Returning to FIG. 1, worksite 100 may also include one or more fluid stations 108 for refilling the fluid tanks 200 (FIG. 2) of fluid delivery machines 106, and one or more fuel stations 110 for refueling mobile machines 102 and fluid delivery machines 106. For example, several fluid stations 108 and/or fuel stations 110 may be positioned at different locations around worksite 100. It is to be appreciated that mobile machines 102 may include combustion power systems, electric power systems, hybrid power systems, and/or other power systems. Accordingly, fuel station 110 may embody a fuel station (e.g., gasoline, diesel, natural gas, or other fuel), a electric charging station, and/or any other type of power station known in the art. In connection with their various operations, mobile machines 102 may communicate with one another, and with a worksite control facility 112, over a network 308 (FIG. 3).

Figure 3:
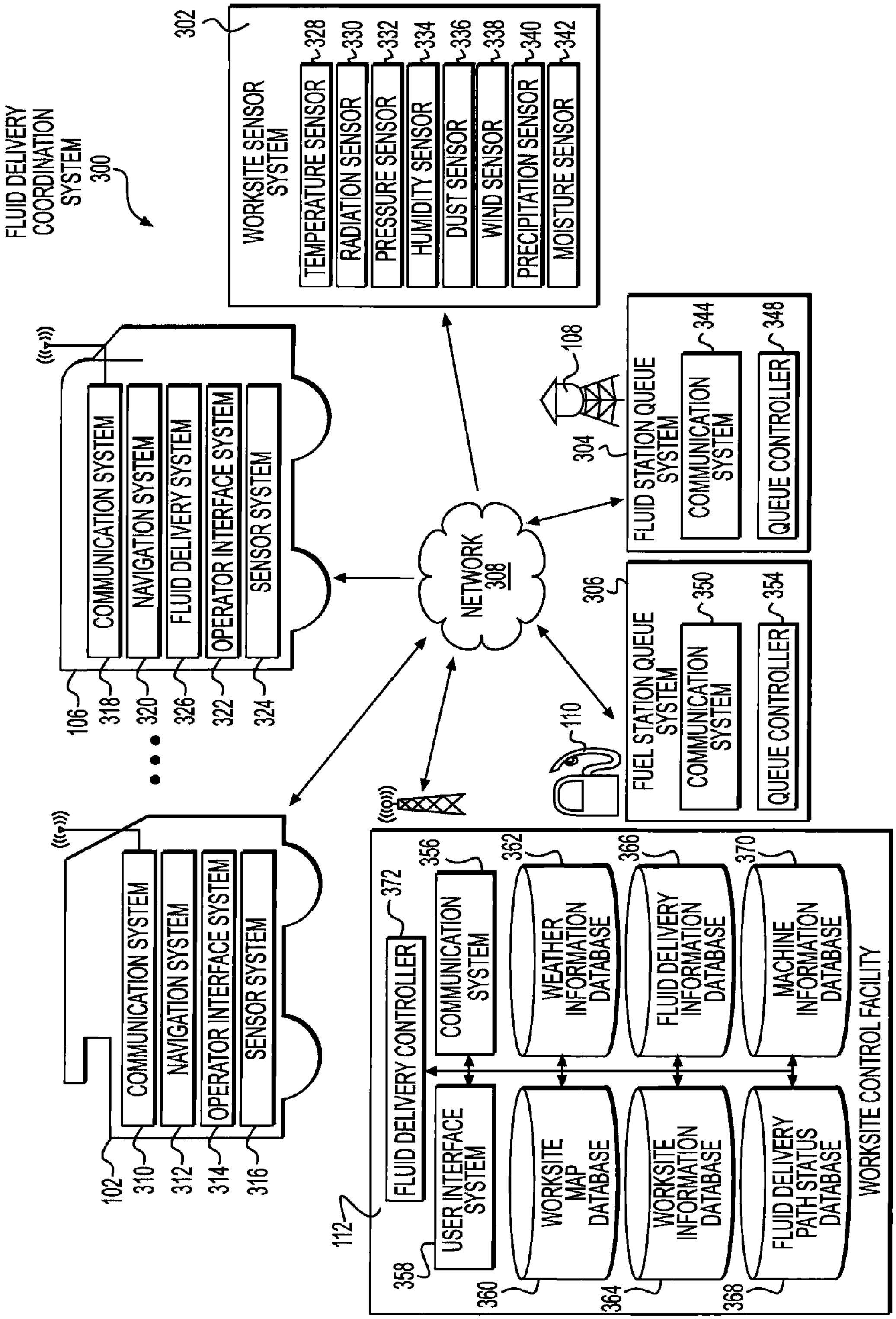
FIG. 3 is a representation of an exemplary fluid delivery coordination system, consistent with the disclosed embodiments.

FIG. 3 illustrates an exemplary fluid delivery coordination system 300, consistent with the disclosed embodiments. As shown, fluid delivery coordination system 300 may include mobile machines 102, fluid delivery machines 106, a worksite sensor system 302, a fluid station queue system 304, a fuel station queue system 306, and/or worksite control facility 112, in communication over network 308. As discussed in further detail below, the elements of fluid delivery coordination system 300 may cooperate to perform the disclosed fluid delivery processes.

Mobile machine 102 may include, among other things, a communication system 310, a navigation system 312, an operator interface system 314, and a sensor system 316. Communication system 310 may include any components enabling mobile machine 102 to communicate with fluid delivery machine 106, worksite sensor system 302, fluid station queue system 304, fuel station queue system 306, and/or worksite control facility 112 over network 308 in connection with the disclosed fluid delivery processes. Communication system 310 may include one or more modulators, demodulators, multiplexers, demultiplexers, network communication devices, wireless devices, antennas, modems, or any other devices configured to support two-way communication. In addition, communication system 310 may communicate using satellite, cellular, infrared, radio, or other types of wireless communication signals.

Navigation system 312 may include any components or systems known in the art for autonomous, semi-autonomous, and/or operator-assisted direction or control of mobile machine 102. For example, navigation system 312 may include a Global Positioning System (GPS) or a Global Navigation Satellite System (GNSS), an obstacle detection and avoidance system, an electronic engine control module, an electronic transmission control module, a steering control module, and/or other devices or systems configured to provide instructions to other systems of mobile machine 102 to control at least some aspects of navigating mobile machine 102 on worksite 100. Navigation system 312 may be configured to instruct mobile machine 102 to travel a certain path or route, and/or to perform a certain task (e.g., excavating, scraping, loading, dumping, etc.) based on instructions received from worksite control facility 112, with or without the assistance of an operator of mobile machine 102.

Operator interface system 314 may include any components or systems known in the art for receiving input from, and/or providing output to, an operator of mobile machine 102. For example, operator interface system 314 may include one or more displays, monitors, touch-screens, keypads, keyboards, levers, joysticks, wheels, pedals, and/or other such input/output devices and associated systems for controlling operations of mobile machine 102.

Sensor system 316 may include one or more sensors onboard mobile machine 102 and configured to sense or measure various parameters associated with mobile machine 102 and/or worksite 100, and to generate corresponding signals indicative of values of the sensed parameters. Periodically or in real time, sensor system 316 may provide to communication system 310 information indicative of the values of the various sensed parameters for communication to other mobile machines 102 and/to worksite control facility 112. The values of the sensed parameters may be used, for example, by the fluid delivery system 326 of fluid delivery machine 106 and/or by worksite control facility 112, in connection with the disclosed fluid delivery processes. Specifically, and as discussed in further detail below, at least some of the information gathered by sensor system 316 may be used by worksite control facility 112 and/or by fluid delivery machines 106 to determine a fluid delivery route and/or an amount of fluid to deliver to the route, among other things.

In one embodiment, sensor system 316 may include one or more onboard “machine operations” sensors. The machine operations sensors may be configured to sense or measure one or more parameters associated with the operation of mobile machine 102, and to generate signals indicative of values of the sensed operational parameters. Generally, and as discussed in detail below, the information gathered by the onboard machine operations sensors may be used by fluid delivery system 326 and/or by worksite control facility 112 to determine a fluid delivery route and/or an amount of fluid to deliver to the route. For example, the information gathered by sensor system 316, periodically or in real time, may be gathered and communicated to worksite control facility 112 and/or to fluid delivery machines 106 via communication system 310 for use in the disclosed fluid delivery processes.

In one embodiment, sensor system 316 may include a location device (not shown) configured to determine a real-time location of mobile machine 102 on worksite 100. The location device may include, for example, a Global Positioning System (GPS) device, a Global Navigation Satellite Systems (GNSS) device, a laser range finder device, an Inertial Reference Unit (IRU), or an odometric or dead-reckoning positioning device. In one embodiment, the location device may provide the latitude and longitude coordinates corresponding to the current location of mobile machine 102.

Sensor system 316 may further include an orientation sensor (not shown) configured to determine a heading, direction, and/or inclination of mobile machine 102 on the surface of worksite 100. The orientation sensor may include, for example, a laser-level sensor, a tilt sensor, inclinometer, a radio direction finder, a gyrocompass, a fluxgate compass, or another device configured to detect the heading, inclination, and/or direction of mobile machine 102.

Sensor system 316 may further include a steering sensor (not shown) configured to sense or otherwise determine a steering angle or direction of mobile machine 102. Sensor system 316 may further include a speed sensor configured to sense or detect a ground speed or travel speed of mobile machine 102. For example, the speed sensor may sense or detect the rotational speed of one or more traction devices (e.g., wheels, tracks, or treads) of mobile machine 102. In addition, the speed sensor may be configured to sense and provide an indication when mobile machine 102 loses traction or slips.

Sensor system 316 may further include a load sensor (not shown) configured to sense or determine a loading condition of mobile machine 102. For example, the load sensor may comprise a scale or pressure sensor configured to detect whether mobile machine 102 is carrying a load. Alternatively or additionally, the load sensor may measure or otherwise determine the amount of the load, for example, in terms of the total weight of the load and/or as a proportion of the total loading capacity of mobile machine 102. In other embodiments, the load sensor may embody a switch or other device set by the operator of mobile machine 102 to indicate whether mobile machine 102 is carrying a load.

Sensor system 316 may further include a machine vision device (not shown) configured to detect a range and a direction to objects on the surface of worksite 100 within a field of view. The machine vision device may include, for example, a Light Detection and Ranging (LIDAR) device, a Radio Detection and Ranging (RADAR) device, a Sound Navigation and Ranging (SONAR) device, a camera device, and/or any other imaging devices known in the art.

Sensor system 316 may further include a fuel sensor (not shown) configured to sense a fuel level or an amount of the onboard fuel reserves of mobile machine 102. In a case where mobile machine 102 has an electric or fuel-electric hybrid power system, sensor system 316 may alternatively or additionally include a sensor configured to sense a charge level of a battery or other main energy storage device of mobile machine 102.

In certain embodiments, it is contemplated that sensor system 316 may also include one or more onboard "environmental" sensors configured to sense or measure certain environmental parameters associated with worksite 100. For example, sensor system 316 may include a temperature sensor configured to sense an atmospheric temperature of worksite 100, a radiation sensor configured to sense an intensity of solar radiation at worksite 100, a pressure sensor configured to sense an atmospheric pressure at worksite 100, a humidity sensor configured to sense the humidity at worksite 100, a dust sensor configured to determine a dust condition or a dust level of the air at worksite 100, a wind sensor configured to sense a speed and/or direction of the wind on worksite 100, a precipitation sensor configured to determine an amount or rate of precipitation on worksite 100, and/or devices for sensing other environmental parameters associated with worksite 100.

Like the information gathered by the "machine operations" sensors, the information gathered by the onboard "environmental" sensors may be used by the fluid delivery system 326 of fluid delivery machine 106 and/or by worksite control facility 112 to determine a fluid delivery route and/or an amount of fluid to deliver to the route, as discussed below. It is to be appreciated that sensor system 316 may include other devices for sensing other parameters associated with mobile machines 102 and/or worksite 100, if desired.

Continuing with FIG. 3, fluid delivery machine 106 may include similar components and systems as mobile machine 102, such as a communication system 318, a navigation system 320, an operator interface system 322, and/or a sensor system 324 and, accordingly, further discussion thereof is omitted. In the case of fluid delivery machine 106, however, sensor system 324 may also include a fluid sensor configured to sense a fluid level or an amount (e.g., a volume) of fluid contained in tank 200.

In addition, as mentioned above, fluid delivery machine 106 may include a fluid delivery system 326 configured to deliver fluid, such as water and/or other dust suppressant, to the worksite surface. For example, fluid delivery system 326 may comprise a hydraulic system (not shown) configured to pump fluid from tank 200 to spray heads 202, which may spray the fluid. Fluid delivery system 326 may also include a fluid delivery controller (not shown), such as a specialized electronic control unit, configured to control the functions of fluid delivery system 326 to spray the fluid based on commands received from worksite control facility 112. Alternatively or additionally, the fluid delivery controller may control fluid delivery system 326 to spray fluid in response to commands received from an operator via operator interface system 322. For example, based on the commands from worksite control facility 112 and/or the operator, fluid delivery system 326 may spray fluid onto the worksite surface at a commanded rate (e.g., liters per minute or liters per square meter per minute), in a commanded amount (e.g., liters or liters per square meter), and/or with a commanded spray or pattern.

In one exemplary embodiment, and as discussed in further detail below, mobile fluid delivery machine 106 may receive fluid delivery mission instructions from worksite control facility 112. As used herein, a "mission" refers to an assignment to a particular fluid delivery machine 106 to travel a specified route over roads 104 and deliver specified amounts of fluid to one or more paths in the route. Accordingly, in one embodiment, the instructions for a fluid delivery mission may specify the particular paths in a route, the sequence in which the fluid delivery machine 106 is to travel the route, and the amounts of fluid (e.g., liters) the fluid delivery machine 106 is to deliver to the respective paths in the route. In addition, the mission instructions may further specify spray patterns, spray widths, and/or other spray parameters for the paths in the route.

Based on the mission instructions, navigation system 320 may control or direct fluid delivery machine 106 to travel the route specified by the mission. For example, in an autonomous embodiment, using worksite map information stored in onboard memory or received from worksite control facility 112, navigation system 320 may provide instructions to other systems of fluid delivery machine 106 to cause fluid delivery machine 106 to automatically travel the route specified by the mission. In semi-autonomous or manual embodiments, navigation system 320 may provide a map of worksite 100 to the operator of fluid delivery machine 106 via a display device associated with operator interface system 322. The displayed map may visually indicate the route specified by the mission, allowing the operator to control the fluid delivery machine 106 to travel the route and treat the route with fluid.

Moreover, based on the mission instructions, fluid delivery system 326 may spray the onboard fluid onto the worksite surface as fluid delivery machine 106 travels the specified route. For example, as discussed in greater detail below, the mission instructions may indicate the various paths in the fluid delivery route, as well as an allocated amount of fluid to be delivered to the respective paths. Using this allocation information, a known or measured speed at which fluid delivery machine 106 travels the route, and/or a known or calculated area of the paths, fluid delivery system 326 may calculate a rate at which the fluid must be sprayed from spray heads 202 in order to deliver the fluid to the paths in the amounts specified by the mission instructions. In addition, based on the worksite map information stored in the onboard memory and on the current location of fluid delivery machine 106 (e.g., received from the location device), fluid delivery system 326 may begin spraying the fluid at the appropriate rate when fluid delivery machine 106 enters a particular paths specified by the mission instructions, as discussed in further detail below.

In semi-autonomous or manual embodiments, rather than directly controlling the amount of fluid sprayed onto the worksite surface, fluid delivery system 326 may provide a visual or audible indication of the fluid delivery rate to the operator of fluid delivery machine 106 via operator interface system 322. Based on this visual or audible indication, the operator may use operator interface system 322 to manually control the rate at which the fluid is sprayed as to deliver the specified amounts of fluid to each path in the route. For example, fluid delivery system 326 may visually or audibly indicate to the operator whether to increase or decrease the fluid delivery rate as fluid delivery machine 106 travels the route specified by the mission instructions.

In certain embodiments, fluid delivery system 326 may also monitor the performance of fluid delivery machine 106 during the mission. For example, fluid delivery system 326 may monitor the amounts of fluid delivered to respective paths in the route. Upon completing the mission, or even during the mission, fluid delivery system 326 may generate and send a mission report to worksite control facility 112 regarding the performance of fluid delivery machine 106 on the mission, as discussed below. Worksite control facility 112 may use the mission performance information, for example, to determine and update the fluid delivery information of the paths, and/or to plan subsequent missions for other fluid delivery machines 106 in the fleet. This will also be discussed in further detail below.

Continuing with FIG. 3, worksite sensor system 302 may include one or more sensors 328-342 configured to sense selected "environmental" parameters associated with worksite 100, and to generate signals indicative of values of the sensed parameters. Worksite sensor system 302 may communicate the sensed information to worksite control facility 112 and/or to mobile machines 102 for use in the disclosed fluid delivery processes. In one embodiment, sensors 328-342 may be similar to the "environmental" sensors discussed above in connection with the sensor systems of mobile machines 102 and/or fluid delivery machines 106.

It is to be appreciated that, in some embodiments, the environmental sensors may be omitted from mobile machines 102 and/or fluid delivery machines 106, and the worksite environmental sensing may be carried out entirely by worksite sensor system 302. In other embodiments, however, the worksite environmental sensing operations may be shared by worksite sensor system 302 and the sensor systems of mobile machines 102 and/or fluid delivery machines 106. For example, the sensing systems of mobile machines 102 and/or fluid delivery machines 106 may be equipped with certain types of sensors, while worksite sensor system 302 may be equipped other types of sensors.

Referring to FIG. 3, worksite sensor system 302 may include, for example, one or more temperature sensors 328 configured to sense an ambient temperature of worksite 100. Worksite sensor system 302 may further include one or more radiation sensors 330 configured to sense an intensity of solar radiation at worksite 100, pressure sensors 332 configured to sense an atmospheric pressure at worksite 100, and/or humidity sensors 334 configured to sense the humidity at worksite 100. In addition, worksite sensor system 302 may further include one or more dust sensors 336 configured to sense a dust condition or a dust level of the air at worksite 100, wind sensors 338 configured to sense a speed and/or direction of the wind on worksite 100, and/or precipitation sensors 340 configured to sense an amount and/or rate of precipitation on worksite 100. In some configurations, worksite sensor system 302 may include one or more moisture sensors 342 (e.g., buried in or near roads 104) configured to sense the moisture content of the worksite surface. It is to be appreciated that worksite sensor system 302 may alternatively or additionally include other types of sensors or devices for sensing other environmental parameters associated with worksite 100.

In one embodiment, sensors 328-342 may be centrally located, such as at an onsite worksite control facility 112, to provide a global indication of the environmental conditions on worksite 100. In other configurations, however, at least some sensors 328-342 may be positioned around worksite 100 to provide localized indications of the environmental conditions on worksite 100. For example, if worksite 100 is relatively small, perhaps only one of each sensor 328-342 may be employed at a central location, such as worksite control facility 112. If worksite 100 is large, however, multiples of each sensor 328-342 may be positioned at different locations around worksite 100 to provide an accurate indication of the same parameters (e.g., temperature) at each location.

Fluid station queue system 304 may be a control system associated with fluid station(s) 108 and configured to coordinate fluid refill operations for fluid delivery machines 106. In one embodiment, fluid station queue system 304 may include, among other things, a communication system 344 and a queue controller 348.

Communication system 344 may include any components enabling fluid station queue system 304 to communicate with worksite control facility 112, mobile machines 102, and/or fluid delivery machines 106, over network 308 or otherwise, in connection with fluid refill operations. Communication system 344 may include one or more modulators, demodulators, multiplexers, demultiplexers, network communication devices, wireless devices, antennas, modems, or any other devices configured to support two-way communication. In addition, communication system 344 may communicate using satellite, cellular, infrared, radio, or other types of wireless communication signals.

Queue controller 348 may include one or more processors that execute computer programs and/or other instructions and process data to perform fluid refill operations. Queue controller 348 may also include one or more computer-readable storage devices, such as RAM, ROM, and/or any other magnetic, electronic, or optical computer-readable storage devices configured to store program code, instructions, and/or other information for performing fluid refill operations. The storage devices may include, for example, a magnetic hard drive, an optical disk drive, a flash drive, and/or any other information storage device known in the art.

In one embodiment, when a fluid delivery machine 106 runs low on fluid, such as upon completing a mission, worksite control facility 112 may instruct the fluid delivery machine 106 to travel to a specific fluid station 108 for refill. For example, worksite control facility 112 may instruct the fluid delivery machine 106 to travel to the nearest station 108, the station 108 having the shortest queue of machines or wait time, the station 108 having the highest priority, and/or another fluid station 108. Worksite control facility 112 and/or the fluid delivery machine 106 may then communicate with fluid station queue system 304, via communication system 344, to indicate to fluid station queue system 304 that the fluid delivery machine 106 has been assigned to the fluid station 108 for refill.

Queue controller 348 may also determine and assign an appropriate queuing position to the fluid delivery machine 106. The queuing position may be assigned based on one or more factors, such as the priority of the fluid delivery machine 106, the fluid capacity of the fluid delivery machine 106 (i.e., the size of tank 200), the fuel capacity of the fluid delivery machine 106, and/or other information. Then, queue controller 348, via communication system 344, may send instructions to the fluid delivery machine 106 to travel to the assigned queuing position and wait for refill. Queue controller 348 may also determine an estimated wait time for the fluid delivery machine 106 to complete refill, and may send this information to worksite control facility 112 for use in the disclosed fluid delivery processes. Queue controller 348 may also provide further instructions to the fluid delivery machine 106 in connection with fluid refilling operations. For example, queue controller 348 may instruct the fluid delivery machine 106 to change position in the queue as other fluid delivery machines 106 exit the queue.

Fuel station queue system 306 may be a control system associated with fuel station 110 and configured to coordinate fuel refilling (and/or electric charging) operations for mobile machines 102 and/or fluid delivery machines 106. Similar to fluid station queue system 304, in one embodiment, fuel station queue system 306 may include a communication system 350 and a queue controller 354, among other things. The operation of fuel station queue system 306 may be similar to that of fluid station queue system 304 and, accordingly, further discussion thereof is omitted for brevity.

Worksite control facility 112 may represent a central computing system including one or more hardware components and/or software applications that cooperate to manage performance of worksite 100. For example, worksite control facility 112 may include one or more personal computers, desktop computers, laptop computers, handheld computers (e.g., cell phone, PDA, etc.), server computers (e.g., a distributed server system), and/or any other type of computing devices known in the art. In one embodiment, worksite control facility 112 may be associated with a company or business responsible for one or more projects or operations on worksite 100.

Worksite control facility 112 may collect, distribute, analyze, and/or otherwise manage information received from or gathered by mobile machines 102, fluid delivery machines 106, worksite sensor system 302, fluid station queue system 304, and/or fuel station queue system 306. Based on the received information, and on additional worksite information maintained by worksite control facility 112, worksite control facility 112 may control and/or coordinate operations of fluid delivery machines 106. In general, and consistent with the disclosed embodiments, worksite control facility 112 may determine amounts of fluid required by the paths on worksite 100 based on one or more factors. In addition, worksite control facility 112 may determine whether the required amounts of fluid merit selecting a fluid delivery machine 106 to dispatch on a mission to treat the paths with fluid. In certain embodiments, worksite control facility 112 may also determine a route for the selected fluid delivery machine 106 to travel during the mission. These processes will be discussed in further detail below.

As shown in FIG. 3, worksite control facility 112 may include a communication system 356, a user interface 358, a worksite map database 360, a weather information database 362, a worksite information database 364, a fluid delivery information database 366, a fluid delivery path status database 368, and a machine information database 370. Worksite control facility 112 may further include a fluid delivery controller 372. These computing elements of worksite control facility 112 may be communicatively coupled via communication bus or other communication means.

Communication system 356 may include any components enabling worksite control facility 112 to communicate with mobile machines 102, fluid delivery machines 106, worksite sensor system 302, fluid station queue system 304, and/or fuel station queue system 306, over network 308 or otherwise, in connection with the disclosed fluid delivery processes. For example, communication system 356 may include one or more modulators, demodulators, multiplexers, demultiplexers, network communication devices, wireless devices, antennas, modems, or any other devices configured to support two-way communication. In addition, communication system 356 may communicate using satellite, cellular, infrared, radio, or other types of wireless communication signals.

User interface system 358 may include any components known in the art for receiving input from, and/or providing output to, a user associated with worksite control facility 112. For example, user interface system 358 may be utilized by a worksite manager to supervise or control operations on worksite 100. In one embodiment, user interface 358 may include one or more display devices, such as a CRT, LCD, LED, plasma, or other type of display device known in the art. In addition, user interface 358 may include one or more input devices, such as a touch-screen, keyboard, keypad, mouse, microphone, or other type of device known in the art for providing input to a computer. User interface 358 may also include one or more output devices, such as a printer, speaker, plotter, or other type of device known in the art for outputting data from a computer.

Worksite map database 360 may contain one or more electronic maps associated with worksite 100. For example, worksite map database 360 may contain coordinates defining the topography of worksite 100. In addition, worksite map database 360 may contain information about the paths on worksite 100, such as the location, position, shape, and/or form of roads 104. Worksite map database 360 may also contain information identifying the location and/or boundaries of the paths (e.g., intersections). In addition, worksite map database 360 may contain information identifying which paths are eligible for fluid delivery. For example, certain paths may be associated with roads 104 that are closed and/or not in use. According to one embodiment, worksite map database 360 may be used by fluid delivery controller 372 to identify paths and/or routes eligible for fluid delivery. In addition, worksite map database 360 may be used by fluid delivery controller 372 to identify features or characteristics of worksite 100 and/or the paths that have a bearing on determining the amount of fluid to deliver to the path segments, such as the slope, incline, or curvature of the paths.

Weather information database 362 may contain weather information associated with worksite 100. The weather information may comprise, for example, historical weather information and weather forecast information for worksite 100. In one embodiment, the weather information may indicate temperature, solar radiation level, cloud cover, humidity, barometric pressure, chance of precipitation, amount of precipitation, wind speed and direction, and/or other weather data associated with worksite 100 over a period of time. For example, weather information database 362 may contain environmental information collected from worksite sensor system 302 and/or from the environmental sensing systems of mobile machines 102 and/or fluid delivery machines 106 (if any) and compiled over a period of time. In other embodiments, weather information database 362 may embody a weather service providing real-time and historical weather information associated with worksite 100. The weather service may include, for example, an online Internet weather service accessible by worksite control facility 112 over network 308. As discussed in further detail below, weather information database 362 may be used by fluid delivery controller 372 to determine an amount of fluid to deliver to the paths.

Figure 4:
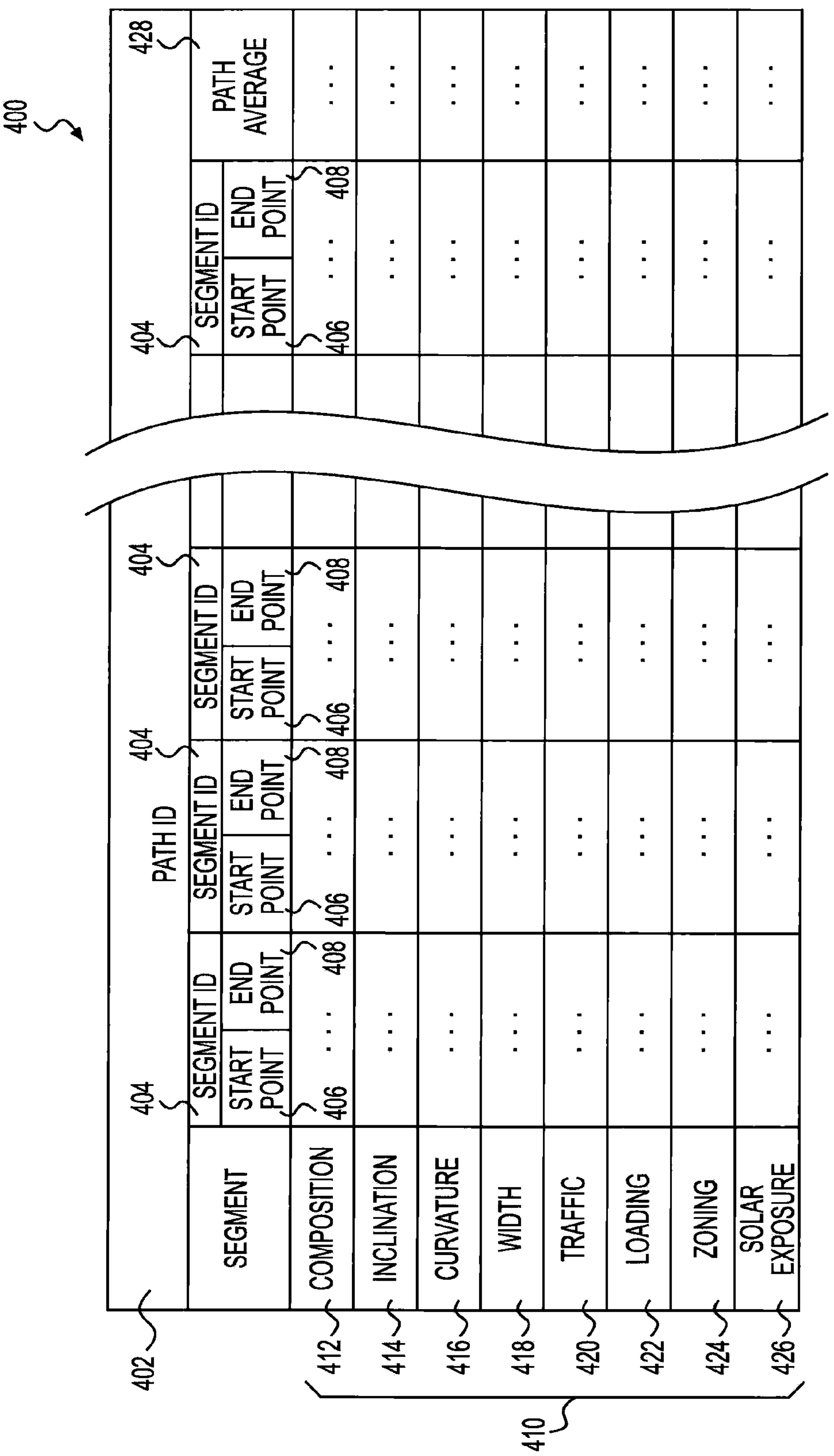
FIG. 4 is a representation of exemplary path characteristics information, consistent with the disclosed embodiments.

Worksite information database 364 may contain information about characteristics and/or attributes of worksite 100 for use by fluid delivery controller 372 in planning fluid delivery missions for one or more fluid delivery machines 106. In one exemplary embodiment, worksite information database 364 may contain a path characteristics table 400, as shown in FIG. 4. Path characteristics table 400 may contain characteristics and/or attribute information about the various paths of worksite 100 for use in determining amounts of fluid to deliver to the paths and/or in planning fluid delivery missions. In one configuration, path characteristics table 400 may comprise one or more lookup tables, relational databases, spreadsheets, metadata documents, matrices, or other data storage structures enabling storing of path characteristics or attributes in association with particular locations on the paths.

For example, as shown in FIG. 4, path characteristics table 400 may include a path ID 402 identifying a path on worksite 100. Path ID 402 may identify path A-B, path B-C, path B-D, or any other path on worksite 100 using a suitable identifier (e.g., "A-B," "Path 1," etc.).

Path characteristics table 400 may also include path segment IDs 404 identifying path segments of the path. As used herein, "path segment" refers to a lengthwise portion of a path. Consistent with the disclosed embodiments, each path on worksite 100 may be divided into one or more sequential path segments, and worksite control facility 112 may determine the amount of fluid to deliver to each path based on predetermined, gathered, and/or computed information about the segments. For example, referring to FIG. 1, path A-B may be 2000 meters long and divided into 200 10-meter segments. Accordingly, in one embodiment, path segment IDs 404 may identify the path segments based on their sequence in the path (e.g., segment 1, segment 2, etc.).

Path characteristics table 400 may also include information specifying a start point 406 and an end point 408 of each segment in the path. Start points 406 and end points 408 may be specified in coordinates of latitude and longitude, worksite coordinates, or in another suitable manner. In other embodiments, start points 406 and end points 408 may be omitted, and the segments of the paths may be identified based on a distance along the path with respect to the beginning or end of the path. For example, continuing with the example of path segment A-B above, the third segment may be defined as starting a distance of 30 meters from the beginning of the path. It is to be appreciated, however, that the individual segments of a path may be identified in path characteristics table 400 in any other suitable manner.

Moreover, path characteristics table 400 may contain information about characteristics 410 or attributes of the respective path segments identified by path segment IDs 404. In one embodiment, path segment characteristics 410 may include surface composition information 412, slope or inclination information 414, path curvature information 416, path width information 418, traffic information 420, machine loading information 422, path zoning information 424, and/or solar exposure information 426 associated with each segment in the path.

Surface composition information 412 may indicate a the type of material composing the worksite surface at the locations of the path segments corresponding to the segment IDs 404. Surface composition information 412 may facilitate embodiments in which a worksite manager determines that certain types of worksite surface materials generally tend to weather and generate more dust than other types of materials, and thus require more fluid. Alternatively or additionally, the worksite manager may determine that certain types of materials generally tend to require more fluid than others in preparation for cutting, scraping, digging, and/or other operations. Accordingly, in one embodiment, surface composition information 412 may indicate a type of material or a general fluid demand associated with the type of material at the location of the path segment (e.g., a rating of 1-10, dry, dusty, etc.). It is to be appreciated, however, that the type of the worksite surface material may be indicated in other ways.

Inclination information 414 may indicate a slope of the surface of the path segments corresponding to the segment IDs 404. Inclination information 414 may facilitate embodiments in which the worksite manager determines that, in general, fluid delivery should be reduced to path segments having inclines, declines, ramps, and/or other steep portions, to provide increased traction to mobile machines 102, fluid delivery machines 106, worksite personnel, etc. in these areas. Alternatively or additionally, the worksite manager may determine that too much fluid delivery to steep path segments may compromise the structural integrity of these areas and create an unnecessary risk for worksite equipment and personnel. Accordingly, inclination information 414 may indicate the slope or inclination of the surface of the path segment in degrees, percent grade, as a rating (e.g., flat, moderate, steep, etc.), and/or in any other suitable manner. In one embodiment, inclination information 414 may indicate the average slope or inclination of the path segments corresponding to the segment ID 404.

Curvature information 416 may indicate a radius or degree of curvature of the path segments corresponding to the segment IDs 404. Curvature information 416 may facilitate embodiments in which the worksite manager determines that fluid delivery should be decreased to portions of the paths having curves to provide increased traction and control to mobile machines 102, fluid delivery machines 106, worksite personnel, etc. when traveling through the curves. In one embodiment, curvature information 416 may indicate the average radius or degree of curvature of the segments corresponding to the path segment IDs 404.

Path width information 418 may indicate a width of the path segments corresponding to the segment IDs 404. Path width information 418 may facilitate embodiments in which the worksite manager determines that the width or distribution with which fluid delivery machines 106 spray the fluid should be changed in accordance with the width of the path. Accordingly, in one embodiment, path width information 418 may indicate the width (e.g., average width) of the path segment corresponding to the path segment ID 404 in units of length, as a rating (e.g., narrow, medium, or wide), as an overall spray surface area, and/or in any other suitable manner.

Traffic information 420 may indicate the presence and/or extent of traffic in the path segments corresponding to the path segment ID 404. Traffic information 420 may facilitate embodiments in which the worksite administrator determines that, in general, areas of heavy traffic and/or heavy use require more fluid than areas of light traffic or low use to compensate for the increased wear and drying of the worksite surface. Accordingly, in one embodiment, traffic information 420 may indicate whether mobile machines 102, fluid delivery machines 106, vehicles, worksite personnel, and/or other objects are located in the path segment corresponding to the path segment ID 404. Periodically or in real time, mobile machines 102, fluid delivery machines 106, vehicles, equipment, communication devices carried by worksite personnel, etc., may communicate their current locations to worksite control facility 112. Worksite control facility 112 may then correlate the locations to the locations of respective path segments, and update the traffic information 420 to indicate the presence (or absence) of traffic in the path segments.

In other embodiments, traffic information 420 may also indicate the traffic density or traffic volume associated with the path segments corresponding to the path segment IDs 404. For example, worksite control facility 112 may monitor the number of mobile machines 102, fluid delivery machines 106, vehicles, worksite personnel, etc., in or passing through the path segments over a predetermined period of time to calculate the traffic volumes or densities in the path segments. Worksite control facility 112 may then update the traffic information 420 with the calculated traffic volumes or densities of the path segments. For example, traffic information 420 may indicate the traffic in the respective path segments as a current or historical number of vehicles and/or machines per hour, a total number of vehicles and/or machines, an overall traffic volume rating (e.g., light, medium, heavy, etc.), and/or in any other suitable manner.

Loading information 422 may indicate a loading condition of mobile machines 102 traveling in the path segments corresponding to the path segment IDs 404. Loading information 422 may facilitate embodiments in which the worksite manager chooses to modify the amount of fluid to be delivered to a path segment based on whether that path segment tends to support traffic from mobile machines 102 carrying loads. It is to be appreciated that mobile machines 102 carrying loads may tend to travel in certain areas of worksite 100 more often than in others. For example, at a mining site 100, excavators and loaders (not shown) may cooperate to load haul trucks 102 with material (e.g., ore) from a stockpile 118. The haul trucks 102 may then carry the material to a designated location, such a loading platform of a train that transports the material to a distributor. In performing these operations, the haul trucks 102 may usually travel on roads 104 around or near stockpile 118. Thus, all things being equal, paths corresponding to these roads 104 may be subject to more abuse, and thus may tend to generate more dust and/or deteriorate more quickly, than other paths on worksite 100.

Thus, consistent with the disclosed embodiments, the worksite manager may determine that, in general, the amount of fluid to be delivered to different areas of worksite 100 should depend upon the loading of mobile machines 102 traveling in the areas. For example, the worksite manager may decide that additional fluid should be delivered to areas of worksite 100 in which loaded mobile machines 102 travel (or travel more often), to combat the increased dust and/or deterioration of the worksite surface caused by the payloads. Alternatively, the worksite manager may decide that less fluid should be delivered to such areas, to improve traction and operator control in critical areas in which loaded mobile machines 102 travel.

Accordingly, in one exemplary embodiment, mobile machines 102 may periodically or in real time communicate information indicating their current loading conditions and current locations on worksite 100 to worksite control facility 112. For example, each mobile machine 102 may communicate whether that mobile machine 102 is currently carrying a load, the total weight of the load, the amount of the load as a proportion of the maximum payload of the mobile machine 102, and/or other loading information. Using the known locations of mobile machines 102, the loading information, traffic concentration of the loaded mobile machines 102, and/or other information, worksite control facility 112 may then determine and assign a loading condition to the path segments. The loading condition may be representative of the number of loaded mobile machines 102 traveling in the path segments within a predetermined period of time, the weights or amounts of the loads, and/or other loading metrics that indicate the extent to which the path segments are utilized by mobile machines 102 carrying loads. In one embodiment, the loading condition of each segment may correspond to a rating (e.g., light, moderate, heavy, etc.). Worksite control facility 112 may then update loading information 422 associated with the respective path segments with the assigned loading conditions.

Zoning information 424 may indicate whether the path segments corresponding to the path segment IDs 404 are zoned for decreased or increased fluid delivery and, if so, the extent or amount of the decrease or increase. For example, zoning information 424 may indicate the increase or decrease of fluid delivery for each segment as a percentage. In certain embodiments, the worksite manager may decide that certain paths or path segments should be zoned for modified or restricted fluid delivery. For example, path segments near buildings, machinery, worksite infrastructure, worksite personnel, work projects, etc. may be zoned for reduced or restricted fluid delivery, as spraying fluid in these segments may interfere with operations or otherwise be undesirable. For instance, paths or path segments surrounding stockpile 118 may be zoned for reduced fluid delivery to avoid interfering with loading operations. In other embodiments, paths or path associated with traffic intersections, difficult terrain, poor visibility, traffic incidents, and/or other challenges for vehicle or machine operators may be zoned for reduced fluid delivery, as spraying fluid in these areas may render these areas slick or unsafe for traffic. In another example, paths or path segments that are closed, inactive, or not used on a regular basis may be zoned for reduced or restricted fluid delivery to conserve resources for more commonly used areas of worksite 100. In yet another example, certain designated "high-risk" or problematic paths or path segments, such as blind spots, areas of poor visibility, traffic intersections, traffic incidents, difficult terrain, etc., may be zoned for reduced or restricted fluid delivery to improve traction, control, and/or visibility in these areas. On the other hand, it is to be appreciated that certain paths or path segments could be zoned for increased fluid delivery. Accordingly, in one embodiment, zoning information 424 may indicate whether the respective path segments are zoned for decreased or increased fluid delivery and, if so, the extent or amount of the decrease or increase. For example, zoning information 424 may indicate a volume, volume per area, percentage, and/or rate at which fluid delivery for the segment is to be decreased or increased.

Solar exposure information 426 may indicate whether and/or to what extent the path segments corresponding to the path segment IDs 404 are exposed to solar radiation, for example, with respect to the date and time of day. It is to be appreciated that the evaporation rate of fluid on worksite 100 may increase as solar radiation increases. Accordingly, the worksite administrator may decide that, to use fluid delivery resources efficiently, the amount of fluid delivered to the path segments should depend upon the extent to which the path segments are exposed to solar radiation throughout the day. For example, some path segments of a deep, open mine pit, such as ramp 114, may only be exposed to direct solar radiation in the Spring and Summer between late morning and early afternoon. Solar exposure information 426 may be used in addition to, or in the alternative of, solar radiation information gathered from worksite sensor system 302, the sensor systems of mobile machines 102 or fluid delivery machines 106, and/or weather information database 362.

As shown in FIG. 4, path characteristics table 400 may further include a path average column 428. Path average column 428 may indicate average values for the path segment characteristics 410 over the entire path (e.g., path A-B). For example, path average column 428 may indicate an average surface composition value, surface inclination value, curvature value, width value, traffic volume value, machine loading value, zoning value, and solar exposure value for the entire path. Fluid delivery controller 372 may determine the average values, for example, by weighting and averaging the values of the path segment characteristics 410 for each path segment in the path according to the surface area and/or length of each path segment.

Path characteristics table 400 may be created and maintained by the worksite manager based on survey information, experimental data, or other reports or information associated with worksite 100. In addition, as described above, worksite control facility 112 may update path characteristics table 400 periodically or in real time based on information received from mobile machines 102, fluid delivery machines 106, and worksite sensor system 302, as conditions on worksite 100 change. For example, an operator of a mobile machine 102 may report a traffic incident at a particular location on worksite 100 to worksite control facility 112 using operator interface system 314. In response, worksite control facility 112 may update zoning information 424 to zone the path segment corresponding to the location of the mobile machine 102 for restricted fluid delivery, for example, based on the number of prior traffic incidents reported for that segment or location. Moreover, although path characteristics table 400 only illustrates characteristics or attributes of one path (e.g., path A-B), it is to be appreciated that table 400 may be extrapolated to accommodate any number of paths on worksite 100.

Fluid delivery information database 366 may contain information enabling fluid delivery controller 372 to determine amounts of fluid to deliver to the path segments, based on one or more of the factors discussed above. For example, in one embodiment, fluid delivery information database 366 may store a predetermined baseline fluid level $F_{baseline}$ for each path segment. As used herein, the "baseline fluid level" $F_{baseline}$ for a particular path segment may refer to a predetermined amount of fluid (e.g., volume or volume per area) required to maintain that path segment in satisfactory condition with respect to dust, surface material binding, soil compaction, and/or other surface characteristics under predetermined baseline environmental conditions. For example, based on experience, survey data, the dimensions and characteristics of and/or other information about worksite 100, the worksite manager may determine that a particular segment of path A-B should be maintained at a baseline fluid level $F_{baseline}$ of 100 liters, distributed evenly over the area of the path segment, when the temperature at worksite 100 is 20° C., the atmospheric pressure is 1000 mbar, the wind speed is 2 kmph, the solar radiation is 160 Watts per square meter, etc. Similar determinations may be made with respect to the path segments of the other paths on worksite 100.

Fluid delivery information database 366 may also contain information for determining a desired fluid level $F_{desired}$ for the path segments. As used herein, the "desired fluid level" $F_{desired}$ for a particular path segment refers to a calculated amount of fluid (e.g., volume or volume per area) required to maintain that path segment in satisfactory condition with respect to dust, surface material binding, soil compaction, and/or other surface characteristics, under current environmental conditions. In other words, the desired fluid level $F_{desired}$ for a path segment may correspond to a target fluid level that fluid delivery coordination system 300 aims to maintain for the path segment, in view of current environmental conditions. In one embodiment, fluid delivery information database 366 may contain maps, formulas, look-up tables, and/or other means for determining fluid level modification factors M for adjusting the baseline fluid level $F_{baseline}$ for each path segment to obtain the desired fluid level $F_{desired}$ for each segment, based on the current environmental conditions.

For example, fluid delivery information database 366 may contain a predetermined map, formula, or lookup table for determining a temperature fluid level modification factor $M_{temperature}$ for modifying or adjusting the baseline fluid level $F_{baseline}$ based on the current temperature at worksite 100. It is to be appreciated that, as the temperature on worksite 100 increases, fluid may tend to evaporate and leave the worksite surface more quickly. Thus, more fluid may be required as the temperature increases. Accordingly, the map, formula, or lookup table for the temperature modification factor $M_{temperature}$ may be such that the temperature modification factor $M_{temperature}$ increases in relation an increase in temperature at worksite 100.

Fluid delivery information database 366 may include similar predetermined maps, formulas, or lookup tables for determining a pressure fluid level modification factor $M_{pressure}$, a solar radiation fluid level modification factor $M_{radiation}$, a humidity fluid level modification factor $M_{humidity}$, a wind speed fluid level modification factor $M_{wind}$, and/or a precipitation fluid level modification factor $M_{precipitation}$ for modifying or adjusting the baseline fluid level $F_{baseline}$ based respectively on a current atmospheric pressure, solar radiation level, humidity level, wind speed, and/or rate or amount of precipitation at worksite 100. It is to be appreciated that, as the atmospheric pressure on worksite 100 increases, fluid may tend to evaporate and leave the worksite surface more slowly. Thus, less fluid may be required as the pressure increases. Accordingly, the map, formula, or lookup table for the pressure fluid level modification factor $M_{pressure}$ may be such that the pressure fluid level modification factor $M_{pressure}$ decreases in relation to an increase in pressure at worksite 100.

As solar radiation on worksite 100 increases, fluid may tend to evaporate and leave the worksite surface more quickly. Thus, more fluid may be required as the solar radiation increases, and the map, formula, or lookup table for that the solar radiation fluid level modification factor $M_{radiation}$ may be such that the solar radiation fluid level modification factor $M_{radiation}$ increases in relation to an increase in solar radiation at worksite 100.

As humidity on worksite 100 increases, fluid may tend to evaporate and leave the worksite surface more slowly. In addition, some moisture may be absorbed by the worksite surface. Thus, less fluid may be required as the humidity increases, and the map, formula, or lookup table for the humidity fluid level modification factor $M_{humidity}$ may be such that the humidity fluid level modification factor $M_{humidity}$ decreases in relation to an increase in humidity at worksite.

As the wind speed on worksite 100 increases, fluid may tend to evaporate and leave the worksite surface more quickly. Thus, more fluid may be required as the wind speed increases, and the map, formula, or lookup table for the wind speed fluid level modification factor $M_{wind}$ may be such that the wind speed fluid level modification factor $M_{wind}$ increases in relation to an increase in wind speed.

In addition, as the rate of precipitation on worksite 100 increases, moisture may be absorbed into the worksite surface, and less fluid delivery may be required. Thus, the map, formula, or lookup table for the precipitation fluid delivery modification factor $M_{precipitation}$ may be such that the precipitation fluid delivery modification factor $M_{precipitation}$ decreases in relation to an increase in precipitation rate or amount.

In one embodiment, the desired fluid level $F_{desired}$ of a path segment may be determined using the modification factors as follows:

$$F_{desired}=F_{baseline}\times(M_{temperature}+M_{pressure}+M_{radiation}+M_{humidity}+M_{wind}+M_{precipitation}). \quad (1)$$

It is to be appreciated that the modification factors may be suitably weighted in accordance with their respective influence on the moisture content of the worksite surface. For example, under normal circumstances, humidity may have a greater influence on the moisture content of the worksite surface than atmospheric pressure. Thus, the humidity fluid level modification factor $M_{humidity}$ may be weighted more heavily than the pressure fluid level modification factor $M_{pressure}$. It is also to be appreciated that at least some of the modification factors may take on negative values and thereby decrease the desired fluid level $F_{desired}$. For example, the humidity $M_{humidity}$ and precipitation $M_{precipitation}$ fluid level modification factors may take on negative values at humidity and precipitation levels that tend to increase the moisture content of the worksite surface.

Consistent with the disclosed embodiments, the desired fluid level of an entire path (e.g., path A-B) may be the sum of the individual desired fluid levels $F_{desired}$ of the path segments in the path. The maps, formulas, look-up tables, and/or other means for determining the various fluid level modification factors M may be determined or set in advance by a worksite manager or engineer based on experimental data, survey data, experience, or other knowledge about worksite 100. In addition, fluid level modification factors M for additional or different factors, such as, for example, the sensed moisture content of the worksite surface, may be taken into consideration in determining the desired fluid level $F_{desired}$ of a path or path segment.

In addition, fluid delivery information database 366 may contain information for determining a rate or index of evaporation $R_{Evaporation}$ of the fluid from the path segments. As used herein, the evaporation rate $R_{Evaporation}$ may refer to the rate at which fluid evaporates or otherwise leaves the surface of the path segments. In one embodiment, fluid delivery information database 366 may contain one or more predetermined maps, formulas, or lookup tables for determining the evaporation rate $R_{Evaporation}$ based on the current environmental conditions. For example, fluid delivery information database 366 may contain one or more maps, formulas, or lookup tables for determining component evaporation rates $R_{temperature}$, $R_{pressure}$, $R_{radiation}$, $R_{humidity}$, $R_{wind}$ and $R_{precipitation}$ respectively attributable to the current temperature, pressure, solar radiation, humidity, wind speed, and rate of precipitation at worksite 100. It is to be appreciated that the maps, formulas, or lookup tables may be configured such that the component evaporation rate $R_{temperature}$ due to temperature increases with an increase in temperature at worksite 100. The maps, formulas, or lookup tables may be configured such that the evaporation rate $R_{pressure}$ due to atmospheric pressure decreases with an increase in atmospheric pressure at worksite 100. The maps, formulas, or lookup tables may be configured such that the evaporation rate $R_{radiation}$ due to the amount of solar radiation increases with an increase in the amount of solar radiation at worksite 100. The maps, formulas, or lookup tables may be configured such that the evaporation rate $R_{humidity}$ due to humidity decreases with an increase in humidity at worksite 100. The maps, formulas, or lookup tables may be configured such that the evaporation rate $R_{wind}$ due to wind speed increases with an increase in the wind speed at worksite 100. The maps, formulas, or lookup tables may be configured such that the evaporation rate $R_{precipitation}$ due to precipitation decreases with an increase in the rate of precipitation at worksite 100.

In one embodiment, the actual fluid level $F_{actual}$ of a path segment may be determined using the component evaporation rates R and an amount of time T since the actual fluid level $F_{actual}$ or initial fluid level $F_{initial}$ as last calculated, as follows:

$$F_{actual}=F_{initial}\times(R_{temperature}+R_{pressure}+R_{radiation}+R_{humidity}+R_{wind}+R_{precipitation})\times T, \tag{2}$$

It is noted that the initial fluid level $F_{initial}$ of each path segment may be set in advance by a worksite manager or engineer and stored in a memory associated with fluid delivery controller 372 for use in the disclosed fluid delivery processes. Moreover, like the fluid level modification factors M discussed above, the component evaporation rates R may be suitably weighted in accordance with the respective influence their respective parameters have on fluid evaporating or otherwise leaving the worksite surface. It is to be appreciated that the maps, formulas, look-up tables, and/or other means for determining the various component evaporation rates R may be determined or set in advance by a worksite manager or engineer based on experimental data, survey data, experience, or other knowledge about worksite 100. In addition, component evaporation rates R for additional or different factors may be taken into consideration in determining the actual fluid level $F_{actual}$ of a path segment. Consistent with the disclosed embodiments, the actual fluid level of an entire path (e.g., path A-B) may be the sum of the individual actual fluid levels $F_{actual}$ of the segments in the path.

Fluid delivery information database 366 may also contain information for determining the fluid delivery requirement $F_{required}$ of the path segments. As used herein, the "fluid delivery requirement" $F_{required}$ of a path segment refers to an additional amount of fluid (e.g., volume or volume per area) required to bring that path segment from the actual fluid level $F_{actual}$ to the desired fluid level $F_{desired}$. Accordingly, the fluid delivery requirement $F_{required}$ of a path segment may be determined based on the following:

$$F_{required}=F_{desired}-F_{actual}. \tag{3}$$

Moreover, fluid delivery information database 366 may also contain information for determining a modified fluid delivery requirement $F_{modified}$ for the path segments. As used herein, the "modified fluid delivery requirement" $F_{modified}$ of a path segment refers to the fluid modified of delivery requirement $F_{required}$ of that path segment, adjusted or modified based on one or more of the path segment characteristics 410 associated with that path segment.

For example, fluid delivery information database 366 may contain one or more predetermined maps, formulas, or lookup tables for determining a surface composition characteristic factor $C_{composition}$ for modifying or adjusting the fluid delivery requirement $F_{required}$ of the path segment based on the surface composition information 412 associated with the path segment. For example, as discussed above, the worksite administrator may determine that the amount of fluid delivery to a particular path segment should depend upon the type of material composing the surface of the path segment. Accordingly, in one embodiment, the one or more predetermined maps, formulas, or lookup tables may provide different values for the surface composition characteristic factor $C_{composition}$ depending upon the rating of the surface material of the path segment as indicated by composition information 412.

Fluid delivery information database 366 may similarly contain means for determining a slope or inclination characteristic factor $C_{inclination}$ for modifying or adjusting the fluid delivery requirement $F_{required}$ of the path segment based on the slope or inclination 414 associated with the path segment. For example, as discussed above, the worksite administrator may determine that the amount of fluid delivery to a particular path segment should be reduced as the inclination of the path segment increases. Accordingly, in one embodiment, the one or more predetermined maps, formulas, or lookup tables may provide reduced values for the inclination characteristic factor $C_{inclination}$ as the slope or inclination of the path segment, indicated by inclination information 414, increases.

Fluid delivery information database 366 may similarly contain means for determining a curvature characteristic factor $C_{curvature}$ for modifying or adjusting the fluid delivery requirement $F_{required}$ of the path segment based on the curvature information 416 associated with the path segment. For example, as discussed above, the worksite administrator may determine that the amount of fluid delivery to a particular path segment should be reduced as the curvature of the path segment increases. Accordingly, in one embodiment, the one or more predetermined maps, formulas, or lookup tables may provide reduced values for the curvature characteristic factor $C_{curvature}$ as the curvature of the path segment, as indicated by curvature information 416, increases.

Similarly, fluid delivery information database 366 may contain means for determining a width characteristic factor $C_{width}$ for modifying or adjusting the desired fluid level $F_{desired}$ of the path segment based on the width information 418 associated with the path segment. For example, the worksite administrator may determine that the amount of fluid delivery to a particular path segment should be increased as the width of the path segment increases. Accordingly, in one embodiment, the one or more predetermined maps, formulas, or lookup tables may provide increased values for the width characteristic factor $C_{width}$ as the width of the path segment, as indicated by width information 418, increases.

Fluid delivery information database 366 may similarly contain means for determining a traffic characteristic factor $C_{traffic}$ for modifying or adjusting the fluid delivery requirement $F_{required}$ of the path segment based on the traffic information 420 associated with the path segment. For example, as discussed above, the worksite administrator may determine that the amount of fluid delivery to a particular path segment should be increased as the amount of traffic in the path segment increases. Accordingly, in one embodiment, the one or more predetermined maps, formulas, or lookup tables may provide reduced values for the traffic characteristic factor $C_{traffic}$ as the amount of traffic in the path segment, as indicated by traffic information 420, increases.

Fluid delivery information database 366 may similarly contain means for determining a machine loading characteristic factor $C_{loading}$ for modifying or adjusting the fluid delivery requirement $F_{required}$ of the path segment based on the machine loading information 422 associated with the path segment. For example, as discussed above, the worksite administrator may determine that the amount of fluid delivery to a particular path segment should be increased as the loading of mobile machines 102 in the path segment increases. Accordingly, in one embodiment, the one or more predetermined maps, formulas, or lookup tables may provide reduced values for the loading characteristic factor $C_{loading}$ as the amount of loading of mobile machines 102 in the path segment, as indicated by loading information 422, increases.

Similarly, fluid delivery information database 366 may contain means for determining a zoning characteristic factor $C_{zoning}$ for modifying or adjusting the fluid delivery requirement $F_{required}$ of the path segment based on the zoning information 424 associated with the path segment. In one embodiment, the one or more predetermined maps, formulas, or lookup tables may provide different values for the zoning characteristic factor $C_{zoning}$ based on the zoning information 424 associated with the path segment.

Fluid delivery information database 366 may similarly contain means for determining a solar exposure characteristic factor $C_{solar}$ for modifying or adjusting the fluid delivery requirement $F_{required}$ of the path segment based on the solar exposure information 426 associated with the path segment. For example, as discussed above, the worksite administrator may determine that the amount of fluid delivery to a particular path segment should be increased as the solar radiation on the path segment increases. Accordingly, in one embodiment, the one or more predetermined maps, formulas, or lookup tables may provide increased values for the solar radiation characteristic factor $C_{solar}$ as the amount of solar radiation in the path segment, as indicated by solar exposure information 426, increases.

Fluid delivery information database 366 may similarly contain means for determining a dust level characteristic factor $C_{dust}$ for modifying or adjusting the fluid delivery requirement $F_{required}$ of the path segment based on an amount of sensed dust in or near the path segment. For example, as discussed above, the worksite administrator may determine that the amount of fluid delivery to a particular path segment should be increased as the dust level on the path segment increases. Accordingly, in one embodiment, the one or more predetermined maps, formulas, or lookup tables may provide increased values for the dust level characteristic factor $C_{solar}$ as the amount of solar radiation in the path segment, as indicated by the sensor data, increases.

In one embodiment, the modified fluid delivery requirement $F_{modified}$ of a path segment may be determined using the characteristic factors C as follows:

$$F_{modified}=F_{required}\times(C_{composition}+C_{inclination}+C_{curvature}+C_{width}+C_{traffic}+C_{loading}+C_{zoning}+C_{solar}+C_{dust}). \quad (4)$$

It is to be appreciated that the characteristic factors C may be suitably weighted based on the relative importance assigned to their respective parameters by the worksite manager. In one embodiment, the worksite administrator may decide that any increase in fluid delivery warranted based on the surface composition information 412, traffic volume information 420, machine loading information 422, and/or solar exposure information 426 associated with a path segment should be secondary to a decrease in fluid delivery warranted based on the zoning information 424 associated with the segment, and may weigh the factors accordingly. As an example, at a traffic intersection, it may be desirable to reduce fluid delivery (based on zoning information) due to safety or other concerns, even if the other factors would otherwise dictate an increase in fluid delivery. Consistent with the disclosed embodiments, the modified fluid delivery requirement $F_{modified}$ of an entire path (e.g., path A-B) may be the sum of the individual modified fluid delivery requirements $F_{modified}$ of the segments in the path.

Fluid delivery path status database 368 may contain information indicating a status of the paths with respect to fluid delivery operations. In one exemplary embodiment, shown in FIG. 5, path status database 368 may contain a path fluid status table 500 containing fluid delivery status information associated with the paths on worksite 100.

For example, path fluid status table 500 may include a path ID 502 identifying a path on worksite 100. Similar to path ID 402 (FIG. 4), in one configuration, path ID 502 may identify path A-B, path B-C, path B-D, or any other path on worksite 100 using a suitable identifier (e.g., "A-B," "Path 1," etc.).

Path fluid status table 500 may also include path segment IDs 504 identifying individual segments of the path identified by path ID 502. Similar to path ID 402 (FIG. 4), in one embodiment, path segment IDs 404 may identify the path segments based on their sequence in the path (e.g., segment 1, segment 2, etc.).

Moreover, path fluid status table 500 may include fluid status information 506 associated with the respective path segments identified by path segment IDs 504. In one embodiment, fluid status information 506 may include priority information 508, baseline fluid level information 510, initial fluid level information 512, actual fluid level information 514, desired fluid level information 516, fluid delivery requirement information 518, modified fluid delivery requirement information 520, and moisture status information 522.

Priority information 508 may indicate a priority of the path segments corresponding to the path segment IDs 504 with respect to fluid delivery operations. Priority information 508 may facilitate embodiments in which the worksite manager decides that certain paths or path segments should be given priority over others with respect to consideration for a fluid delivery mission. For example, paths or path segments that support active work operations may be given a high priority, since it is important to control dust in areas where worksite personnel are exposed. In another example, paths or path segments bordering a residential neighborhood may be given a high priority, to help ensure that dust conditions do not arise and cause a nuisance to the public. Accordingly, in one embodiment, priority information 508 may indicate a priority of the path segments on a predetermined priority scale (e.g., 1-10, low-high, etc.). It is to be appreciated, however, that the priority of the path segments may be indicated in other ways.

Baseline fluid level information 510 may specify the predetermined baseline fluid level $F_{baseline}$ (discussed above) for the path segments corresponding to the path segment IDs 504. In one embodiment, the baseline fluid level $F_{baseline}$ may be specified in terms of a total volume or as a volume per area.

Initial fluid level information 512 may specify the initial fluid level $F_{initial}$ (discussed above) for the path segments corresponding to the path segment IDs 504. In one embodiment, the initial fluid level $F_{initial}$ may be specified in terms of a total volume or as a volume per area.

Actual fluid level information 514 may specify the actual fluid level $F_{actual}$ (discussed above) for the path segments corresponding to the path segment IDs 504. In one embodiment, the actual fluid level $F_{actual}$ may be specified in terms of a total volume or as a volume per area. Fluid delivery controller 372 may periodically update actual fluid level information 514 by "counting down" or reducing the actual fluid level $F_{actual}$ using one or more of the component evaporation rates $R_{temperature}$, $R_{pressure}$, $R_{radiation}$, $R_{humidity}$, $R_{wind}$, and $R_{precipitation}$ as time elapses and/or as conditions on worksite 100 change, as discussed above.

Desired fluid level information 516 may specify the desired fluid level $F_{desired}$ (discussed above) for the path segments corresponding to the path segment IDs 504. In one embodiment, the desired fluid level $F_{desired}$ may be specified in terms of a total volume or as a volume per area. Fluid delivery controller 372 may periodically update desired fluid level information 516 by modifying or adjusting the baseline fluid level $F_{baseline}$ using the information stored in fluid delivery information database 366 and environmental information received from weather information database 362, from worksite sensor system 302, and/or from the sensor systems of mobile machines 102 and/or fluid delivery machines 106.

Fluid delivery requirement information 518 may specify the fluid delivery requirement $F_{required}$ (discussed above) for the path segments corresponding to the path segment IDs 504. In one embodiment, the fluid delivery requirement $F_{required}$ may be specified in terms of a total volume or as a volume per area. Fluid delivery controller 372 may periodically update fluid delivery requirement information 518 based on a difference between the desired and actual fluid levels $F_{desired}$, $F_{actual}$, as discussed above.

Modified fluid delivery requirement information 520 may specify the modified fluid delivery requirement $F_{modified}$ (discussed above) for the path segments corresponding to the path segment IDs 504. In one embodiment, the modified fluid delivery requirement $F_{modified}$ may be specified in terms of a total volume or as a volume per area. Fluid delivery controller 372 may periodically update modified fluid delivery requirement information 520 based on the path segment characteristic factors $C_{composition}$ $C_{inclination}$, $C_{curvature}$, $C_{width}$, $C_{traffic}$, $C_{loading}$, $C_{zoning}$, $C_{solar}$, and $C_{dust}$, and the fluid delivery requirement $F_{required}$ associated with the path segment.

Moisture status information 522 may indicate the current overall moisture content of the path segments corresponding to the path segment IDs 504. In other words, moisture status information 522 may indicate how depleted of fluid or "dry" each path segment is. Fluid delivery controller 372 may use moisture status information 522 to determine which paths or path segments merit fluid delivery at a particular time. In one embodiment, moisture status information 522 for a path segment may indicate a ratio of the actual fluid level $F_{actual}$ to the desired fluid level $F_{desired}$ of that segment. For example, if the desired fluid level $F_{desired}$ of a path segment 100 liters, and the actual fluid level $F_{actual}$ for the path segment is 90 liters, the moisture status information 522 of that path segment may be defined as 90/100, or 90%.

In other embodiments, moisture status information 522 may indicate one of a plurality of categories or ranges specifying the moisture content of the path segments. For example, a "red" status may indicate that the path segment is severely dry or under-watered, a "yellow" status may indicate that the path segment is moderately dry or under-watered, a "green" status may indicate that the path segment is appropriately watered, and a "blue" status may indicate that the path segment is overwatered. These different statuses may correspond to respective ratios of the actual fluid level $F_{actual}$ to the desired fluid level $F_{desired}$ of the segments. For example, the red status may correspond to less than 40%, the yellow status may correspond to 40-75%, the green status may correspond to 75-110%, and the blue status may correspond to greater than 100%. It is to be appreciated, however, that other schemes for defining the moisture status of the path segments may be used.

Figure 5:
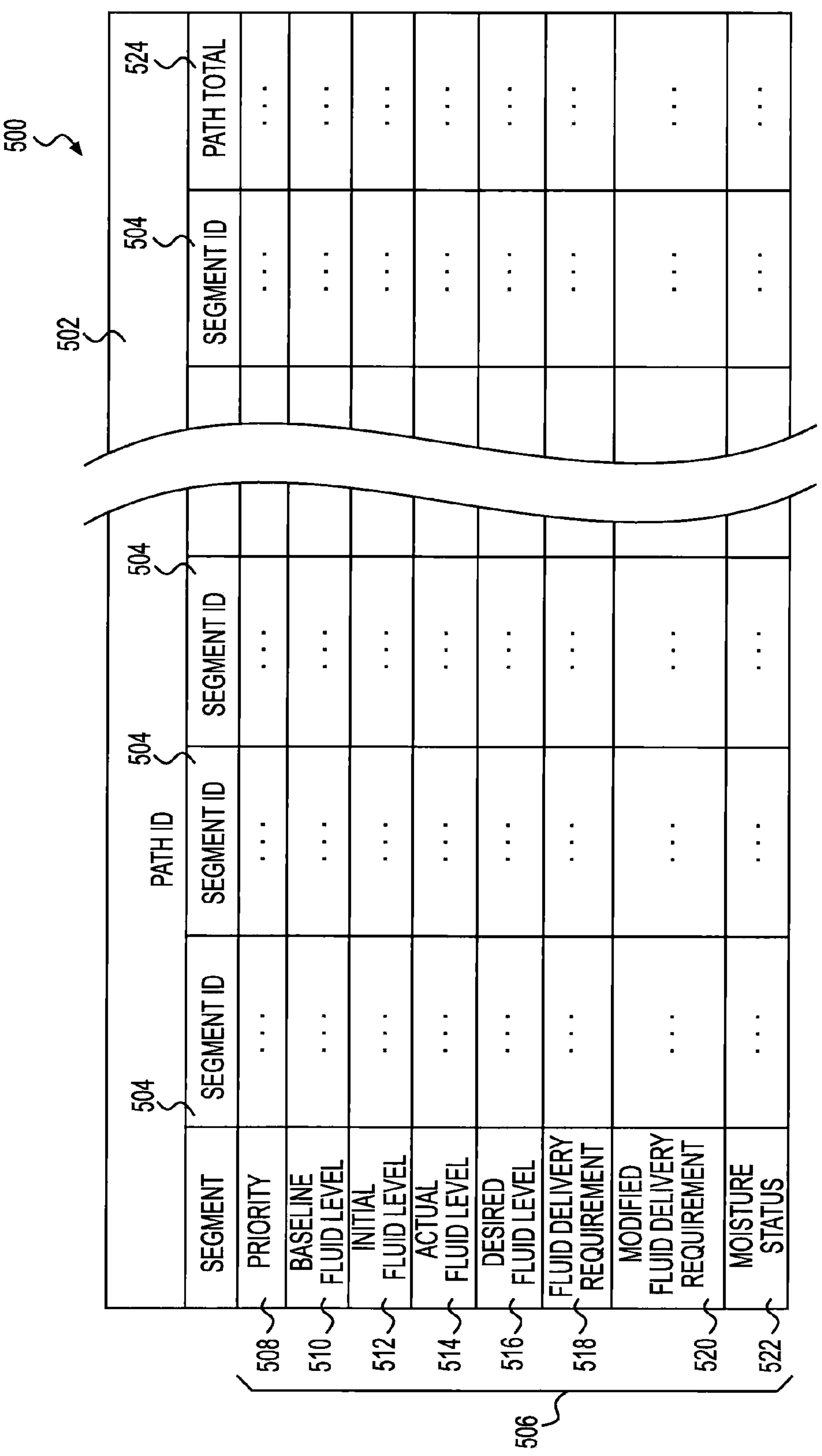
FIG. 5 is a representation of exemplary path fluid status information, consistent with the disclosed embodiments.

As shown in FIG. 5, path fluid status table 500 may further include a path total column 524. Path total column 524 may indicate total values for the fluid status information 506 over the entire path (e.g., path A-B). For example, path total column 524 may indicate a total or average priority of the path, a total baseline fluid level of the path, a total initial fluid level of the path, a total actual fluid level of the path, a total desired fluid level of the path, a total fluid delivery requirement of the path, a total modified fluid deliver requirement of the path, and a total or average moisture status of the path. Fluid delivery controller 372 may determine the values of path total column 524, for example, by adding the fluid status information 506 values for all the segments in the path, and/or by weighting and averaging the fluid status information 506 values for all the segments in the path according to the surface area of each path segment.

Returning to FIG. 3, machine information database 370 may contain information about mobile machines 102 and/or fluid delivery machines 106. FIG. 6 shows an exemplary representation of fluid delivery machine information 600 that may be stored in machine information database 370. In one embodiment, fluid delivery machine information 600 may include machine identification information 602, machine location information 604, machine priority information 606, fluid level information 608, fuel level information 610, machine status information 612, and/or mission information 614. In other embodiments, however, fluid delivery machine information 600 may include additional or different information regarding the fluid delivery machines 106.

Machine identification information 602 may include information uniquely identifying fluid delivery machines 106 on worksite 100. For example, machine identification information 602 may indicate serial numbers or other IDs associated with respective fluid delivery machines 106 in the fleet (e.g., Machine 1, Machine 2, Machine A, Machine B, etc.).

Machine location information 604 may include information indicating the respective geographical locations of the fluid delivery machines 106 identified by machine identification information 602. For example, machine location information 604 may specify latitude and longitude coordinates, worksite coordinates, a path segment, a path, and/or other information identifying the respective current locations of fluid delivery machines 106 on worksite 100.

Machine priority information 606 may include information indicating respective priorities of the fluid delivery machines 106 identified by machine identification information 602. For example, in certain embodiments, the worksite administrator may determine that, all things being equal, certain fluid delivery machines 106 should be considered for dispatch on a fluid delivery mission over others. For example, fluid delivery machines 106 may be prioritized based on certain fluid delivery attributes or characteristics of the fluid delivery machines 106. Certain fluid delivery machines 106 may be newer, more reliable, faster, and/or more fuel efficient than others. Certain fluid delivery machines 106 may be equipped with more advantageous fluid delivery features than other fluid delivery machines 106. For example, some fluid delivery machines 106 may have a larger fuel tank or fluid tank 200, a greater range, a greater number of spray heads 202, spray heads 202 providing broader, more even, or more efficient coverage, and/or other more desirable characteristics than others. It is to be appreciated, however, that other fluid delivery characteristics may be taken into consideration in setting a priority for a fluid delivery machine 106 as a candidate for a fluid delivery mission.

Fluid level information 608 may include information indicating respective fluid levels of the tanks 200 of the fluid delivery machines 106 identified by machine identification information 602. That is, fluid level information 608 may indicate the onboard fluid reserves of fluid delivery machines 106. For example, fluid level information 608 may indicate the current volume of fluid in the tank 200, or the current fill level of the tank 200 (e.g., as a percentage).

Similarly, fuel level information 610 may indicate respective fuel levels of the fuel tanks of the fluid delivery machines 106 identified by machine identification information 602. That is, fuel level information 610 may indicate the current respective onboard fuel reserves of fluid delivery machines 106. For example, fuel level information 610 may indicate the current volume of fuel onboard, the current fill level of the fuel tank (e.g., as a percentage), a time and/or distance until "empty," etc. It is noted that, in a case where a particular fluid delivery machine 106 includes an electric or fuel-electric hybrid power system, fuel level information 610 may alternatively or additionally indicate the current charge level of the electric power source onboard.

Machine status information 612 may indicate respective statuses of the fluid delivery machines 106 identified by machine identification information 602. In one embodiment, machine status information 612 may indicate whether the fluid delivery machine 106 is currently available or unavailable for dispatch on a fluid delivery mission. For example, a fluid delivery machine 106 may be unavailable for dispatch on a fluid delivery mission if that fluid delivery machine 106 is already on a fluid delivery mission, refilling or waiting in a queue to refill at fluid station 108, refueling (or recharging) or waiting in a queue to refuel (or recharge) at fuel station 110, out-of-service, offline, away from worksite 100, etc.

Mission information 614 may include information about fluid delivery missions on which the fluid delivery machines 106 identified by machine identification information 602 are currently dispatched, if any. For example, mission information 614 may identify the paths and/or path segments involved in the mission. Mission information 614 may further indicate an estimated departure time, arrival time, and/or other information relating to the mission.

Returning to FIG. 3, fluid delivery controller 372 may comprise, for example, a general- or special-purpose microprocessor, such as a central processing unit (CPU) capable of controlling numerous functions of worksite control facility 112. Fluid delivery controller 372 may also include one or more memory storage devices, such as RAM, ROM, a magnetic disc storage device (e.g., a hard drive), an optical disc storage device (e.g., a CD- or DVD-ROM), an electronic storage device (e.g., flash memory), and/or any other computing components for running programs for performing the disclosed fluid delivery processes.

Figure 7:
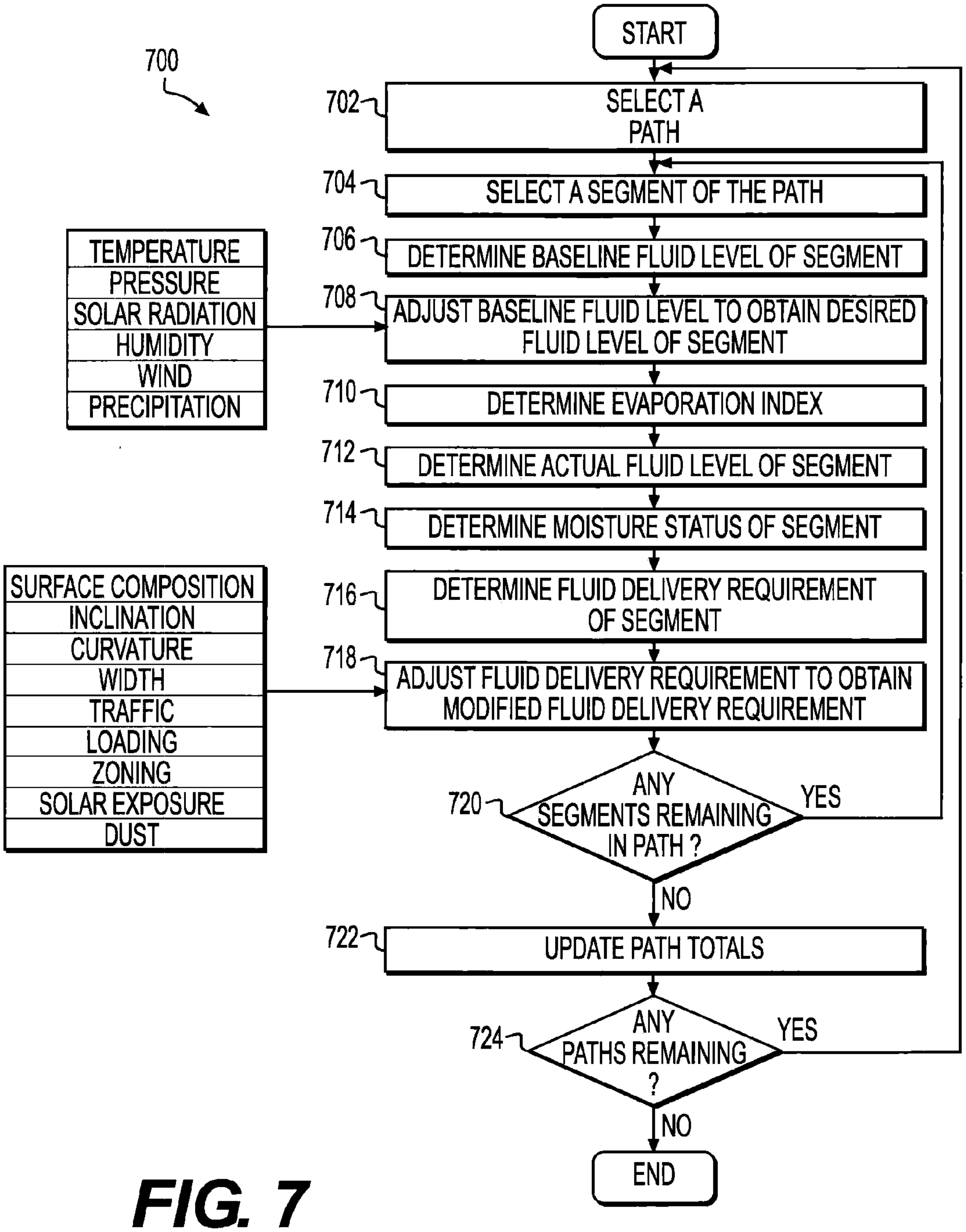
FIG. 7 is a representation of an exemplary process for determining and/or updating the path fluid status information, consistent with the disclosed embodiments.

FIG. 7 illustrates a flowchart depicting an exemplary process 700 that fluid delivery controller 372 may perform to determine and/or update at least some of the fluid status information 506 for the paths on worksite 100, consistent with the disclosed embodiments. In one embodiment, fluid delivery controller 372 may perform process 700 continuously to provide a real-time indication of fluid status of the paths on worksite. In other embodiments, fluid delivery controller 372 may perform process 700 after a predetermined amount of time elapses (e.g., one hour).

In step 702, fluid delivery controller 372 may select a path on worksite 100. For example, path A-B may be selected.

In step 704, fluid delivery controller 372 may select a segment of the path selected in step 702. For example, fluid delivery controller 372 may select a first of the segments in the path.

In step 706, fluid delivery controller 372 may determine a baseline fluid level $F_{baseline}$ of the path segment selected in step 704. For example, fluid delivery controller 372 may retrieve the predetermined baseline fluid level $F_{baseline}$ of the segment from fluid status table 500.

In step 708, fluid delivery controller 372 may adjust the baseline fluid level $F_{baseline}$ to obtain a desired fluid level $F_{desired}$ of the segment, based on environmental factors associated with worksite 100. For example, as shown in FIG. 7, fluid delivery controller 372 may receive worksite temperature data, atmospheric pressure data, solar radiation data, humidity data, wind speed data, and/or precipitation data from worksite sensor system 302, from the sensor systems of mobile machines 102 and/or fluid delivery machines 106, and/or from weather information database 362. In some embodiments, fluid delivery controller 372 may then calculate average values for the worksite temperature, atmospheric pressure, solar radiation, humidity, wind speed, and/or precipitation over a period of time T since process 700 was last performed. Fluid delivery controller 372 may then use the average values, in conjunction with the predetermined maps, formulas, or lookup tables stored in fluid delivery information database 366, to determine corresponding fluid level modification factors $M_{temperature}$, $M_{pressure}$, $M_{radiation}$, $M_{humidity}$, $M_{wind}$, and/or $M_{precipitation}$, as discussed above. Fluid delivery controller 372 may then calculate the desired fluid level $F_{desired}$ for the segment using the determined $F_{baseline}$ and the modification factors $M_{pressure}$, $M_{radiation}$, $M_{humidity}$, $M_{wind}$, and/or $M_{precipitation}$ according to equation (1) above. Fluid delivery controller 372 may then update the desired fluid level information 516 corresponding to the segment stored in path fluid status table 500 with the calculated desired fluid level $F_{desired}$.

In step 710, fluid delivery controller 372 may determine an evaporation index or rate $R_{evaporation}$ of the fluid. For example, as shown in FIG. 7, fluid delivery controller 372 may use the average values for worksite temperature, atmospheric pressure, solar radiation, humidity, wind speed, and/or precipitation, in conjunction with the predetermined maps, formulas, or lookup tables stored in fluid delivery information database 366, to determine corresponding component evaporations rates $R_{temperature}$, $R_{pressure}$, $R_{radiation}$, $R_{humidity}$, $R_{wind}$, and $R_{precipitation}$, as discussed above. Fluid delivery controller 372 may then determine the evaporation rate $R_{evaporation}$, for example, by adding the component evaporation rates $R_{temperature}$, $R_{pressure}$, $R_{radiation}$, $R_{humidity}$, $R_{wind}$, and $R_{precipitation}$. It is to be appreciated that the evaporation rate $R_{evaporation}$ may represent an average evaporation rate $R_{evaporation}$ since the time T process 700 was last performed with respect to the segment.

In step 712, fluid delivery controller 372 may determine an actual fluid level $F_{actual}$ of the path segment. For example, fluid delivery controller 372 may retrieve the last-calculated actual fluid level $F_{actual}$ of the segment from actual fluid level information 514 (FIG. 5). However, in a case where this is the first time the actual fluid $F_{actual}$ is being calculated for the segment, fluid delivery controller 372 may retrieve the fluid level $F_{initial}$ of the segment from initial fluid level information 512 (FIG. 5). Then, fluid delivery controller 372 may determine a "new" actual fluid level $F_{actual}$ of the segment using the evaporation rate $R_{Evaporation}$ determined in step 710, the amount of time T since process 700 was last performed with respect to the path segment, and either the last-calculated actual fluid level $F_{actual}$ or the initial fluid level $F_{initial}$ of the segment, according to equation (2) above. Fluid delivery controller 372 may then update the actual fluid level information 514 corresponding to the segment with the "new" actual fluid level $F_{actual}$.

In step 714, fluid delivery controller 372 may determine a moisture status of the segment. For example, fluid delivery controller 372 may calculate a ratio of the actual fluid level $F_{actual}$ to the desired fluid level $F_{desired}$, as respectively determined in steps 712 and 708. Optionally, fluid delivery controller 372 may assign a moisture status of "red," "yellow," "green," or "blue" based on the ratio, as discussed above. Fluid delivery controller 372 may then update the moisture status information 522 corresponding to the segment with the determined moisture status.

In step 716, fluid delivery controller 372 may determine a fluid delivery requirement $F_{required}$ of the segment. Specifically, fluid delivery controller 372 may calculate the difference between the actual fluid level $F_{actual}$ and the desired fluid level $F_{desired}$ for the segment using equation (3), as discussed above. Fluid delivery controller 372 may then update the fluid delivery requirement information 518 corresponding to the segment with the determined fluid delivery requirement $F_{required}$.

In step 718, fluid delivery controller 372 may adjust the fluid delivery requirement $F_{requirement}$ to obtain a modified fluid delivery requirement $F_{modified}$ of the segment, based on the path segment characteristics 410 associated with the segment. For example, as shown in FIG. 7, fluid delivery controller 372 may receive surface composition information 412, inclination information 414, curvature information 416, width information 418, traffic information 420, machine loading information 422, zoning information 424, and solar exposure information 426 associated with the segment. In some embodiments, fluid delivery controller 372 may then calculate average values for the surface composition, inclination, curvature, width, traffic volume, machine loading, zoning, and solar exposure associated with the segment over a period of time T since process 700 was last performed with respect to the segment. Fluid delivery controller 372 may then use the average values, in conjunction with the predetermined maps, formulas, or lookup tables stored in fluid delivery information database 366, to determine corresponding characteristic factors $C_{composition}$, $C_{inclination}$, $C_{curvature}$, $C_{width}$, $C_{traffic}$, $C_{loading}$, $C_{zoning}$, $C_{solar}$, and $C_{dust}$, as discussed above. Fluid delivery controller 372 may then calculate the modified fluid delivery requirement $F_{required}$ for the segment using the determined fluid delivery requirement $F_{requirement}$ and the characteristic factors $C_{composition}$, $C_{inclination}$, $C_{curvature}$, $C_{width}$, $C_{traffic}$, $C_{loading}$, $C_{zoning}$, $C_{solar}$, and $C_{dust}$, according to equation (4) above. In some embodiments, fluid delivery controller 372 may also modify or adjust the modified fluid delivery requirement $F_{required}$ based on weather forecast information associated with worksite 100. For example, fluid delivery controller 372 may reduce the modified fluid delivery requirement $F_{required}$ based on an amount of expected precipitation at worksite 100. Fluid delivery controller 372 may then update the modified fluid delivery requirement information 520 corresponding to the segment with the modified fluid delivery requirement $F_{required}$.

In step 720, fluid delivery controller 372 may determine whether there are any remaining segments in the path. If not, processing may return to step 704, and fluid delivery controller 372 may repeat the above-described steps with respect to another segment in the path. That is, fluid delivery controller 372 may repeat the above-described steps until the fluid status information 506 for all the segments in the path (e.g., path A-B) has been determined.

If there are no segments remaining in the path, in step 722, fluid delivery controller 372 may update fluid status information 506 with the totals for the entire path. For example, fluid delivery controller 372 may calculate a total actual fluid level $F_{actual}$ for the path by adding the actual fluid levels $F_{actual}$ of each segment in the path. Similarly, fluid delivery controller 372 may calculate a total desired fluid level $F_{desired}$, a total fluid delivery requirement $F_{required}$, and a total modified fluid delivery requirement $F_{modified}$ for the path by adding the individual desired fluid levels $F_{desired}$, fluid delivery requirements $F_{required}$, and modified fluid delivery requirements $F_{modified}$, respectively, of each segment in the path. Fluid delivery controller 372 may also calculate a total or average moisture status for the path by adding, weighting, and/or averaging the individual moisture statuses of each segment in the path. Fluid delivery controller 372 may then update path total column 524 (FIG. 5) to reflect these totals.

In step 724, fluid delivery controller 372 may determine whether there are any remaining paths on worksite 100 (e.g., path B-C). If so, processing may return to step 702, and fluid delivery controller 372 may repeat the above-described steps with respect to another path.

Figure 8:
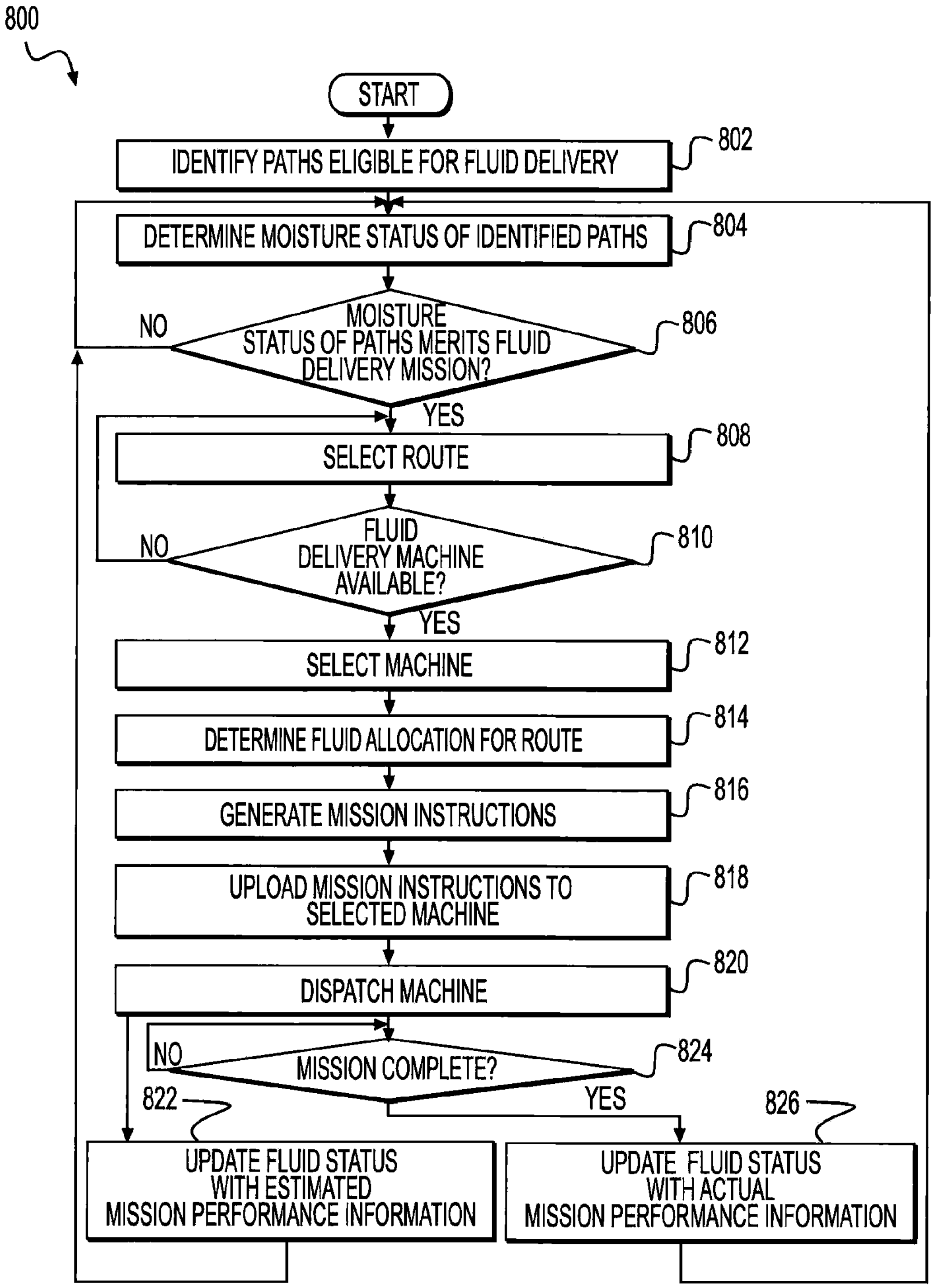
FIG. 8 is a representation of an exemplary fluid delivery mission control process, consistent with the disclosed embodiments.

FIG. 8 illustrates a flowchart depicting an exemplary mission control process 800 that may be performed by fluid delivery controller 372, consistent with the disclosed embodiments. In one embodiment, process 800 may be an automatic or semiautomatic process assisting the worksite administrator or other personnel associated with worksite control facility 112 in planning, scheduling, and/or otherwise coordinating fluid delivery missions on worksite 100. For example, process 800 may display one or more options to the worksite manager via user interface system 358, allowing the worksite manager to plan a fluid delivery mission. In other configurations, process 800 may perform automatically without any input or intervention by the worksite manager.

In step 802, fluid delivery controller 372 may identify paths on worksite 100 eligible for fluid delivery. For example, based on information contained in worksite map database 306 and/or worksite information database 364, fluid delivery controller 372 may generate a listing of all paths on worksite 100. Fluid delivery controller 372 may then remove from the listing any paths that are excluded from fluid delivery, such as paths associated with roads 104 that are closed or no longer in use.

In step 804, fluid delivery controller 372 may determine the moisture status of each of the paths identified in step 802. For example, fluid delivery controller 372 may look up or otherwise retrieve the moisture status information 522 contained in the path total column 524 for each path identified in step 802.

In step 806, fluid delivery controller 372 may determine whether the moisture status of one or more of the paths identified in step 802 merits a fluid delivery mission. That is, fluid delivery controller 372 may determine whether it is warranted to dispatch a fluid delivery machine 106 on a mission. In one embodiment, fluid delivery controller 372 may determine that a fluid delivery mission is warranted when the actual fluid level $F_{actual}$/desired fluid level $F_{desired}$ ratio of a path is below a threshold, such as 75% (e.g., a "yellow" or "red" status). In other embodiments, fluid delivery controller 372 may determine that a fluid delivery mission is warranted when the actual fluid level $F_{actual}$/desired fluid level $F_{desired}$ ratios of multiple paths, or of multiple consecutive paths (e.g., path A-B and path B-C), are below the threshold. As another example, fluid delivery controller 372 may determine that a fluid delivery mission is warranted when the average actual fluid level $F_{actual}$/desired fluid level $F_{desired}$ ratio of multiple paths, or of multiple consecutive paths, is below the threshold.

It is to be appreciated that other methods of determining whether a fluid delivery mission is merited based on the moisture status of one or more paths may be alternatively or additionally employed. For example, fluid delivery controller 372 may determine that a fluid delivery mission is merited when the total fluid delivery requirement $F_{required}$ or the total modified fluid delivery requirement $F_{modified}$ of one or more paths is above a threshold volume. Alternatively or additionally, fluid delivery controller 372 may take into consideration the priority information 508 (FIG. 5), traffic information 420 (FIG. 4), and/or machine loading information 422 (FIG. 4) in determining whether a fluid delivery mission is warranted. Moreover, the worksite manager may set any desired threshold as a trigger for a fluid delivery mission, as some dryness thresholds may result in more efficient or desirable fluid delivery operations than others, depending upon the nature of worksite 100. For example, setting a high threshold may maintain the paths in good condition, as fluid delivery machines 106 may be dispatched on missions more often. However, more fluid delivery resources (e.g., fluid and fuel) may be consumed, increasing the cost of operating system 300. A low threshold, on the other hand, may maintain the worksite surface in a less desirable condition, as fluid delivery machines 106 may be dispatched on missions less often. However, less fluid delivery resources may be consumed, decreasing the cost of operating system 300. Thus, the worksite administrator may set the threshold at a desired point to balance maintaining the paths in a suitable condition with the efficiency or cost of operating system 300.

Continuing with FIG. 8, if it is determined in step 806 that no fluid delivery mission is merited, processing may return to step 804. That is, fluid delivery controller 372 may "wait" until a fluid delivery mission is merited.

If it is determined in step 806 that a fluid delivery mission is merited, fluid delivery controller 372 may select a fluid delivery route in step 808. That is, fluid delivery machine 106 may select a set of sequential paths for a fluid delivery machine 106 to travel on a fluid delivery mission. In one embodiment, fluid delivery controller 372 may identify all possible routes between one or more starting and ending points on worksite 100 of less than a predetermined maximum distance. Referring to FIG. 1, exemplary starting/ending points may include a desired dispatch point, such as point A (FIG. 1), fluid station(s) 108, fuel station(s) 110, the current location of a fluid delivery machine 106, and/or any other points on worksite 100 that fluid delivery machines 106 may access using roads 104.

Fluid delivery controller 372 may then select a route from among the identified possible routes based on one or more factors. For example, fluid delivery controller 372 may select a route based on the fluid status information 506 associated with the paths in the identified routes. Specifically, fluid delivery controller 372 may use priority information 508 and/or moisture status information 522 to choose a route including paths that have a high priority and/or a low moisture status relative to other routes. In other embodiments, fluid delivery controller 372 may select a route based on one or more road usage factors associated with the paths in the identified routes. For example, fluid delivery controller 372 may use traffic information 420 (FIG. 4) to choose a route including paths that carry high traffic volumes relative to other routes. In addition, fluid delivery controller 372 may use machine loading information 422 to choose a route including paths that support more traffic attributable to mobile machines 102 carrying loads than other routes. Fluid delivery controller 372 may also take into consideration distances between fluid stations 108 and fuel stations 110 in selecting a route. In some embodiments, fluid delivery controller 372 may weigh a combination of these factors and/or other factors, and may select a route based on a result thereof. Indeed, the disclosed embodiments contemplate using any such factors or combination of factors to determine a route among multiple paths.

In step 810, fluid delivery controller 372 may determine whether a fluid delivery machine 106 is available for dispatch on a fluid delivery mission. For example, fluid delivery controller 372 may analyze machine status information 612 (FIG. 6) for each fluid delivery machine 106 in the fleet, and may identify all fluid delivery machines 106 available for dispatch on a fluid delivery mission. If it is determined in step 810 that no fluid delivery machine 106 is available for a mission, fluid delivery controller 372 may repeat step 810 (i.e., "wait") until a fluid delivery machine 106 is available for a fluid delivery mission. Alternatively, processing may return to step 804. For example, in some cases, fluid delivery machines 106 may be low on fuel or fluid, refilling or waiting in a queue to refill at fluid station 108, refueling or waiting in a queue to refuel at fuel station 110, undergoing maintenance, offline, and/or otherwise unavailable for a fluid delivery mission at a particular time. In certain embodiments, if the only reason for a fluid delivery machine 106 being unavailable for mission is that the fluid delivery machine 106 is low on fuel or fluid, fluid delivery controller 372 may send an instruction to the fluid delivery machine 106, using communication system 356, to travel to fluid station 108 and/or fuel station 110 for refilling and/or refueling.

If it is determined in step 810 that a fluid delivery machine 106 is available, fluid delivery controller 372 may select a fluid delivery machine 106 for the mission in step 812. Fluid delivery controller 372 may select a fluid delivery machine 106 based on a variety of criteria. For example, fluid delivery controller 372 may use priority information 606 (FIG. 6) to select a fluid delivery machine 106 having a high priority relative to other fluid delivery machines 106. Fluid delivery controller 372 may also use machine location information 604 (FIG. 6) and the start point 406 (FIG. 4) of the first path in the route to select the fluid delivery machine 106 having the shortest distance to travel to reach the start point 406. Fluid delivery controller 372 may also use fluid level information 608 (FIG. 6) to select a fluid delivery machine 106 having onboard fluid reserves to meet or exceed the fluid delivery requirement $F_{required}$ of the entire route. Alternatively, fluid delivery controller 372 may select the fluid delivery machine 106 having onboard fluid reserves that are "closest" to the fluid delivery requirement $F_{required}$ of the entire route. For example, if the total fluid delivery requirement $F_{required}$ of the route is 1,000 liters, and two fluid delivery machines 106 are available—one having 2000 liters onboard and the other having 1,200 liters onboard—fluid delivery controller 372 may select the latter fluid delivery machine 106. Fluid delivery controller 372 may also select the fluid delivery machine 106 based on the amount of fuel reserves, the fuel efficiency of the fluid delivery machine 106, the total distance of the selected route, the location of any fuel station(s) 110 along the route, etc. In another example, fluid delivery machine 106 may select the fluid delivery machine 106 with the longest period of time since its last mission, or the fluid delivery machine 106 with the least amount of total "mission time." Such a configuration may be desirable to use the fleet members evenly. In some embodiments, fluid delivery controller 372 may weigh a combination of these factors or other factors and select an available fluid delivery machine 106 based on a result thereof.

In step 814, fluid delivery controller 372 may determine an allocation of the fluid reserves onboard the selected fluid delivery machine 106 for the mission. In one embodiment, fluid delivery controller 372 may determine the total modified fluid delivery requirement $F_{modified}$ for the entire route by adding the individual modified fluid delivery requirements $F_{modified}$ of all the paths in the route. As indicated above, fluid delivery controller 372 may retrieve this information from the modified fluid delivery requirement information 520 listed in path total column 524 (FIG. 5) for each path in the route.

Fluid delivery controller 372 may then compare the total modified fluid delivery requirement $F_{modified}$ of the route with the amount of fluid onboard the selected fluid delivery machine 106. In one case, the amount of fluid onboard the selected fluid delivery machine 106 may be greater than or equal to the total modified fluid delivery requirement $F_{modified}$ of the route. In other words, there is enough fluid onboard to bring each segment of each path in the route to the desired fluid level $F_{desired}$, as reduced by certain factors discussed above, without the selected fluid delivery machine 106 running out of fluid before completing the mission. In this case, fluid delivery controller 372 may allocate the entire modified fluid delivery requirement $F_{modified}$ of each segment to that segment for the mission. In other words, fluid delivery controller 372 may allocate 100% of the required amount of fluid to each segment of each path in the route. As discussed above, the modified fluid delivery requirement $F_{required}$ of each segment may be indicated in fluid status table 500, specifically, in the desired fluid level information 516 corresponding to path segment ID 504 of the segment.

In another case, the amount of fluid onboard the selected fluid delivery machine 106 may be less than the total modified fluid delivery requirement $F_{modified}$ of the route. In other words, there is not enough fluid onboard to bring each segment of each path in the route to the desired fluid level $F_{desired}$, as reduced by certain factors discussed above, without the selected fluid delivery machine 106 running out of fluid before completing the mission. In this case, fluid delivery controller 372 may allocate less than the entire modified fluid delivery requirement $F_{modified}$ of each segment to that segment for the mission. That is, fluid delivery controller 372 may "scale back" or reduce the amount of fluid to be delivered, such that the fluid delivery machine 106 can complete the mission without running out of fluid. The allocation may be determined based on similar factors as discussed above, such as, for example, the traffic information 420, the machine loading information 422, and/or the zoning information 424 associated with each segment of each path in the route. The allocation may alternatively or additionally be determined based on the priority information 508 and/or the moisture status information 522 associated with each segment of each path in the route. Fluid delivery controller 372 may use any combination of these or other such factors in determining an allocation of the onboard fluid such that fluid delivery machine 106 would not run out of fluid before completing the mission.

In step 816, fluid delivery controller 372 may generate fluid delivery mission instructions for the selected fluid delivery machine 106. FIG. 9 illustrates an exemplary representation of fluid delivery mission instructions 900. As shown in FIG. 9, mission instructions 900 may include a sequence of path segments 902. Mission instructions 900 may also include corresponding allocated fluid delivery amounts 904 and spray distributions 906 for to each segment in the sequence.

In one embodiment, sequence 902 may identify each path segment in route selected in step 808, as well as the order in which the segments are to be traveled by the fluid delivery machine 106 during the mission. Sequence 902 may further include information identifying the start point and end point of each segment in the sequence. For example, sequence 902 may include the same or similar information as the segment start points 406 and end points 408 for the segments, as discussed above in connection with path characteristics table 400 (FIG. 4).

Allocated delivery amount 904 may include information identifying a respective amount of fluid to be delivered to each path segment in the sequence during the mission. For example, allocated delivery amount 904 may specify a respective volume of fluid or a volume of fluid per area to be delivered to each segment in the sequence.

Spray distribution 906 may include information identifying a manner in which the fluid is to be sprayed (i.e., from spray heads 202) onto each path segment in the sequence during the mission. For example, spray distribution 906 may indicate a respective width of the spray for each segment in the sequence. For example, spray distribution 906 may indicate a narrow spray, a medium width spray, wide spray, or a spray of a specified width (e.g., 10 meters) for each segment in the sequence. Spray distribution 906 may also indicate which spray heads 202 are to be active/inactive while spraying fluid in the respective segments of the sequence. For example, depending on conditions on worksite 100, only two spray heads (e.g., 202*a* and 202*b*) may be activated in a particular segment. In some embodiments, spray distribution 906 may further indicate a spray pattern for each segment in the sequence. For example, a mist spray, an intermittent spray, or stream spray may be specified for each segment.

Returning to FIG. 8, in step 818, fluid delivery controller 372 may upload the mission instructions to the selected fluid delivery machine 106. For example, fluid delivery controller 372 may transmit the mission instructions to the fluid delivery machine 106 using communication system 356. Upon completing uploading the mission instructions to the fluid delivery machine 106, fluid delivery controller 372 may dispatch the fluid delivery machine 106 on the mission, in step 820. For example, fluid delivery controller 372 may transmit a dispatch instruction to the fluid delivery machine 106 via communication system 356. In addition, fluid delivery controller 372 may update the machine status information 612 for the dispatched fluid delivery machine 106, for example, by changing the machine status to "unavailable." In this manner, while on the mission, that fluid delivery machine 106 may not be taken into consideration for another fluid delivery mission.

In step 822, fluid delivery controller 372 may update path fluid status table 500 (FIG. 5) with estimated performance information for the mission. That is, fluid delivery controller 372 may update path fluid status table 500 based on the amounts of fluid expected to be delivered to each respective segment during the mission. For example, in one embodiment, fluid delivery controller 372 may update the actual fluid level information 514 associated with each segment in the sequence with the corresponding allocated delivery amount 904 for that segment indicated by mission instructions 900. Specifically, fluid delivery controller 372 may add the current actual fluid level $F_{actual}$ of the segment to the corresponding fluid delivery amount 904 for the segment. As discussed above, the allocated delivery amount 904 for each segment corresponds to the amount of fluid allocated to that segment in step 814.

Then, process 800 may return to step 804, and fluid delivery controller 372 may re-determine the moisture status of each of the paths identified in step 802. In other words, fluid delivery controller 372 may repeat the above-described steps to determine whether another fluid delivery mission involving a different fluid delivery machine 106, and perhaps different paths of worksite 100, is warranted.

Meanwhile, in step 824, fluid delivery controller 372 may determine whether the fluid delivery machine 106 dispatched in step 802 has completed the mission. For example, fluid delivery controller 372 may wait to receive a mission performance report from the dispatched fluid delivery machine 106, which may be transmitted by the fluid delivery machine 106 to worksite control facility 112 during or upon completing the mission. FIG. 10 shows an exemplary representation of a mission performance report 1000, which may contain similar information as mission instructions 900 (FIG. 9).

For example, as shown in FIG. 10, mission performance report 1000 may include a sequence 1002 specifying the path segments involved in the mission and the order in which the segments were traveled by the fluid delivery machine 106 during the mission. Also, mission performance report 1000 may include respective actual fluid delivery amounts 1004 for each segment treated with fluid on the mission. Fluid delivery amounts 1004 may specify the respective amount of fluid, in terms of the volume of fluid or the volume of fluid per area, that the fluid delivery machine 106 actually delivered to each segment during the mission.

If it is determined in step 824 that the mission is complete and/or that fluid delivery controller 372 has received a mission performance report 1000 from the fluid delivery machine 106, in step 826, fluid delivery controller 372 may update path fluid status table 500 using the information contained in the mission performance report 1000. It is to be appreciated that step 826 may be performed in a similar manner as discussed above in connection with step 822. However, instead of updating the actual fluid level information 514 for each segment involved in the mission with the amount of fluid expected or estimated to be delivered during the mission, fluid delivery controller 372 may use the actual fluid delivery amount 1004 for the segment indicated by mission performance report 1000. For example, in one embodiment, fluid delivery controller 372 may subtract the expected/estimated delivery amount previously added in step 822 from the current actual fluid level $F_{actual}$ of the segment, and then add the actual fluid delivery amount 1004 for the segment indicated by the mission performance report 1000 to the difference. In addition, fluid delivery controller 372 may account for any evaporation that may have occurred since the fluid was delivered to the segment.

Figure 11:
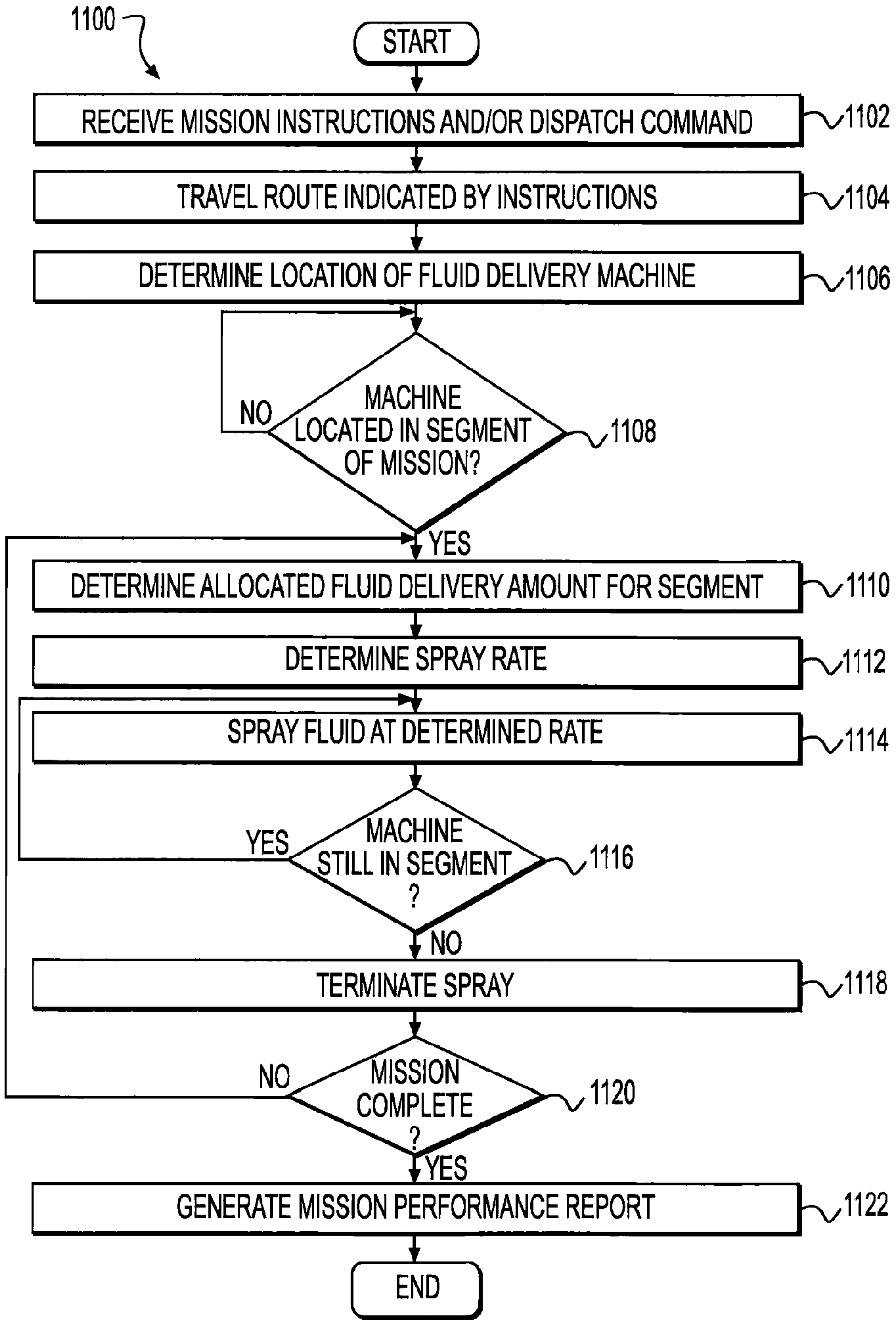
FIG. 11 is a representation of an exemplary fluid delivery mission execution process performed by the fluid delivery machine, consistent with the disclosed embodiments.

FIG. 11 illustrates a flowchart depicting an exemplary mission execution process 1100 that may be performed by a fluid delivery machine 106, consistent with the disclosed embodiments. In an autonomous configuration, process 1100 may operate to automatically control the fluid delivery machine 106 to execute the fluid delivery mission. In a semi-autonomous or manual configuration, process 1100 may operate to provide instructions to the operator of the fluid delivery machine 106 to perform the mission, as described below.

In step 1102, the fluid delivery machine 106 may receive mission instructions 900 and/or a dispatch command from worksite control facility 112. In one embodiment, the mission instructions 900 and/or dispatch command may be received via communication system 318. In addition, the mission instructions 900 may be stored in memory associated with navigation system 320 and/or fluid delivery system 326.

In step 1104, the fluid delivery machine 106 may begin to travel the route specified by the mission instructions 900. For example, in an autonomous embodiment, navigation system 320 may automatically control the fluid delivery machine 106 to travel the route specified by the mission instructions 900, in accordance with autonomous vehicle control techniques known to those skilled in the art. In a semi-autonomous or manual configuration, however, navigation system 320 may use the display device of operator interface 322 to display a map of worksite 100 (FIG. 1) to the operator of the fluid delivery machine 106. The map may indicate the route to the operator, such as by coloring, highlighting, or otherwise visually distinguishing the route on the display device. In response, the operator may use the controls of the fluid delivery machine 106 to cause the fluid delivery machine 106 to begin traveling the route.

In step 1106, the fluid delivery machine 106 may determine its location on worksite 100. For example, navigation system 320 may receive or determine the location of the fluid delivery machine 106 using the GPS or GNSS device or other locating device onboard the fluid delivery machine 106.

In step 1108, the fluid delivery system 326 (FIG. 3) onboard the fluid delivery machine 106 may determine whether the fluid delivery machine 106 is located in a path segment specified for the mission (e.g., the first segment). For example, fluid delivery system 326 may determine whether the received or determined location of the fluid delivery machine 106 is located within the respective start points and endpoints of the segments specified by the sequence 902 contained in the mission instructions 900 (FIG. 9).

If it is determined in step 1108 that the fluid delivery machine 106 is located in a path segment included in the mission, fluid delivery system 326 may determine the amount of fluid allocated to that segment in step 1110. For example, fluid delivery system 326 may retrieve the allocated delivery amount 904 corresponding to the segment from the mission instructions 900. Also in step 1108, fluid delivery system 326 may retrieve the allocated spray distribution 906 corresponding to the segment from the mission instructions 900.

In step 1112, fluid delivery system 326 may determine a rate at which to spray fluid from spray heads 202 to meet the allocated delivery amount 904 for the segment. That is, fluid delivery system 326 may determine the rate at which fluid must be sprayed from spray heads 202 onto the segment in order to spray the fluid in the allocated delivery amount 904. For example, fluid delivery system 326 may calculate the spray rate based on the travel speed of the fluid delivery machine 106, the allocated delivery amount 904, a known area of the segment, and/or other factors.

In step 1114, fluid delivery system 326 may control elements of fluid delivery system 326, such as pumps, valves, nozzles, and/or other elements, to spray fluid from tank 200 onto the segment at the rate determined in step 1112 and with the distribution determined in step 1108. In one embodiment, fluid delivery system 326 may control the spraying to achieve the desired spray rate and/or distribution (e.g., width, pattern, etc.).

In an semi-autonomous or manual configuration, however, fluid delivery system 326 may instead indicate the determined rate to the operator, and the operator may then manipulate the controls of the fluid delivery machine 106 to attempt to spray the fluid at the indicated rate. For example, fluid delivery system 326 may display a graphic, legend, or icon on the display device of operator interface system 322 indicating the determined spray rate. In addition, the actual spray rate may be visually indicated relative to the determined spray rate, so that the operator can determine whether the fluid is being sprayed at the proper rate. In some embodiments, fluid delivery system 326 may provide a warning, such as a visual or audible warning, if the operator is spraying at a greater or lesser rate than the determined rate, for example, outside a certain tolerance.

In step 1116, fluid delivery system 326 may determine whether the fluid delivery machine 106 is still located within the segment. For example, fluid delivery system 326 may receive the current location of the fluid delivery machine 106 from navigation system 320, and may determine whether that location is still within the respective start points and end points of the segments specified by the sequence 902 contained in the mission instructions 900. If so, processing may return to step 1114, and fluid delivery system 326 may continue spraying the fluid at the current rate. If not, fluid delivery system 326 may terminate the spray in step 1118, at least at the current spray rate. In a semi-autonomous or manual configuration, however, fluid delivery system 326 may visually or audibly instruct the operator to terminate the spray via operator interface system 322.

In step 1120, fluid delivery system 326 may determine whether the fluid delivery machine 106 has completed the mission. For example, fluid delivery system 326 may determine whether the fluid delivery machine 106 has traveled through the final segment in the sequence 902 listed in the mission instructions 900. As discussed above, this may be done by receiving the current location of the fluid delivery machine 106 from navigation system 320, and comparing that location to the start point and endpoint of the next segment listed in the sequence 902 contained in the mission instructions 900, if any. If the mission is incomplete, processing may return to step 1110, where fluid delivery system 326 may determine the allocated fluid delivery amount for the next segment.

If the mission is complete, in step 1122, fluid delivery system 326 may generate a mission performance report 1000 as described above in connection with FIG. 10. For example, while performing the mission, fluid delivery system 326 may monitor the fluid level in tank 200. Based on a known capacity of tank 200 and on how much the fluid level in tank 200 drops while in a particular segment, fluid delivery system 326 may calculate an actual volume of fluid or volume of fluid per area sprayed on the segment. Alternatively or additionally, fluid delivery system 326 may utilize meters, valves, and/or other hydraulic means for tracking or measuring the amount of fluid sprayed from spray heads 202 during the mission. In some embodiments, fluid delivery system 326 may use a vision device (not shown), such as a camera, to monitor spray heads 202 during the mission, and may determine or estimate the actual amounts of fluid delivered to the segments based on the image detected by the camera and/or known dimensions or characteristics of fluid delivery system 326. As discussed above, the actual fluid delivery amounts 1004 may be incorporated into the mission performance report 1000 and sent, via communication system 318, to worksite control facility 112 for updating the path fluid status table 500.

Figure 12:
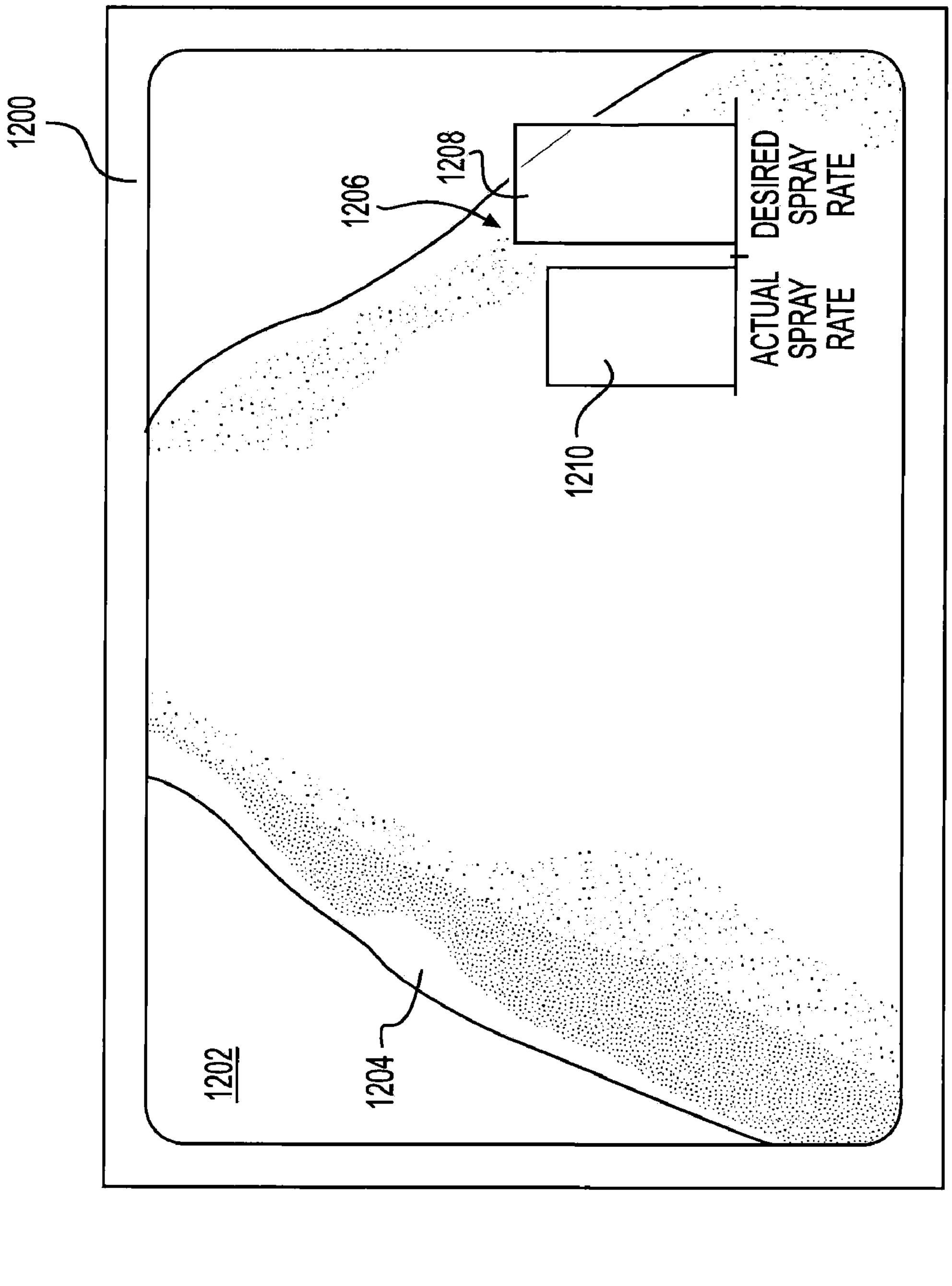
FIG. 12 is a representation of an exemplary fluid delivery information display, consistent with the disclosed embodiments.

FIG. 12 illustrates an exemplary display device 1200 associated with operator interface system 322, consistent with the disclosed embodiments. During a mission, fluid delivery system 326 may cause operator interface system 322 to provide a fluid delivery information display 1202 on display device 1200. As shown, display 1202 may provide a view of a path segment 1204 on which the fluid delivery machine 106 is currently traveling. In addition, display may provide a spray rate icon 1206. Spray rate icon 1206 may include a desired spray rate indicator 1208 visually representing the spray rate determined in step 1112 of FIG. 11 above. Spray rate icon 1206 may also include an actual spray rate indicator 1210 visually representing the current actual rate at which fluid delivery machine is spraying fluid. Fluid delivery system 326 may cause operator interface system 322 to modify desired spray rate indicator 1208 and actual spray rate icon 1210 during the mission as the desired spray rate and actual spray rate change, respectively. Thus, the operator of fluid delivery machine 106 may use spray rate icon 1206 to attempt to control fluid delivery to keep the actual spray rate equal to the desired spray rate.

In some embodiments, fluid delivery system 326 may also cause operator interface system 322 to indicate the route that the fluid delivery machine 106 is to travel during the mission, such as by coloring, shading, highlighting, or otherwise visually distinguishing displayed path segments 1204 as the fluid delivery machine 106 travels the route. Accordingly, the operator may be able to easily identify the route in real time during the mission.

In such a configuration, fluid delivery system 326 may also provide recommendations to the operator during the mission. For example, when fluid delivery machine 106 encounters an intersection of two or more paths on worksite 100, fluid delivery system 326 may select an appropriate one of the paths on which to continue the mission (based on the factors discussed above). Alternatively, fluid delivery system 326 may cause operator interface system 322 to display or otherwise recommend to the operator the selected path. If the operator chooses a different path, fluid delivery system 326 may determine whether continuing down the path chosen by the operator may result in fluid delivery machine 106 running out of fluid before completing the mission. In such a case, fluid delivery system 326 may automatically determine a reallocation of the remaining onboard fluid (as discussed above) to adapt to the path chosen by the operator, so that the fluid delivery machine 106 does not run out of fluid before completing the mission. After determining the reallocation, fluid delivery system 326 may automatically implement the reallocation as the fluid delivery machine 106 continues down the chosen path. Alternatively, fluid delivery system 326 may first prompt or otherwise recommend the reallocation to the operator via fluid delivery information display 1202, giving the operator the option to accept or reject the recommendation via operator interface system 322.

Figure 13:
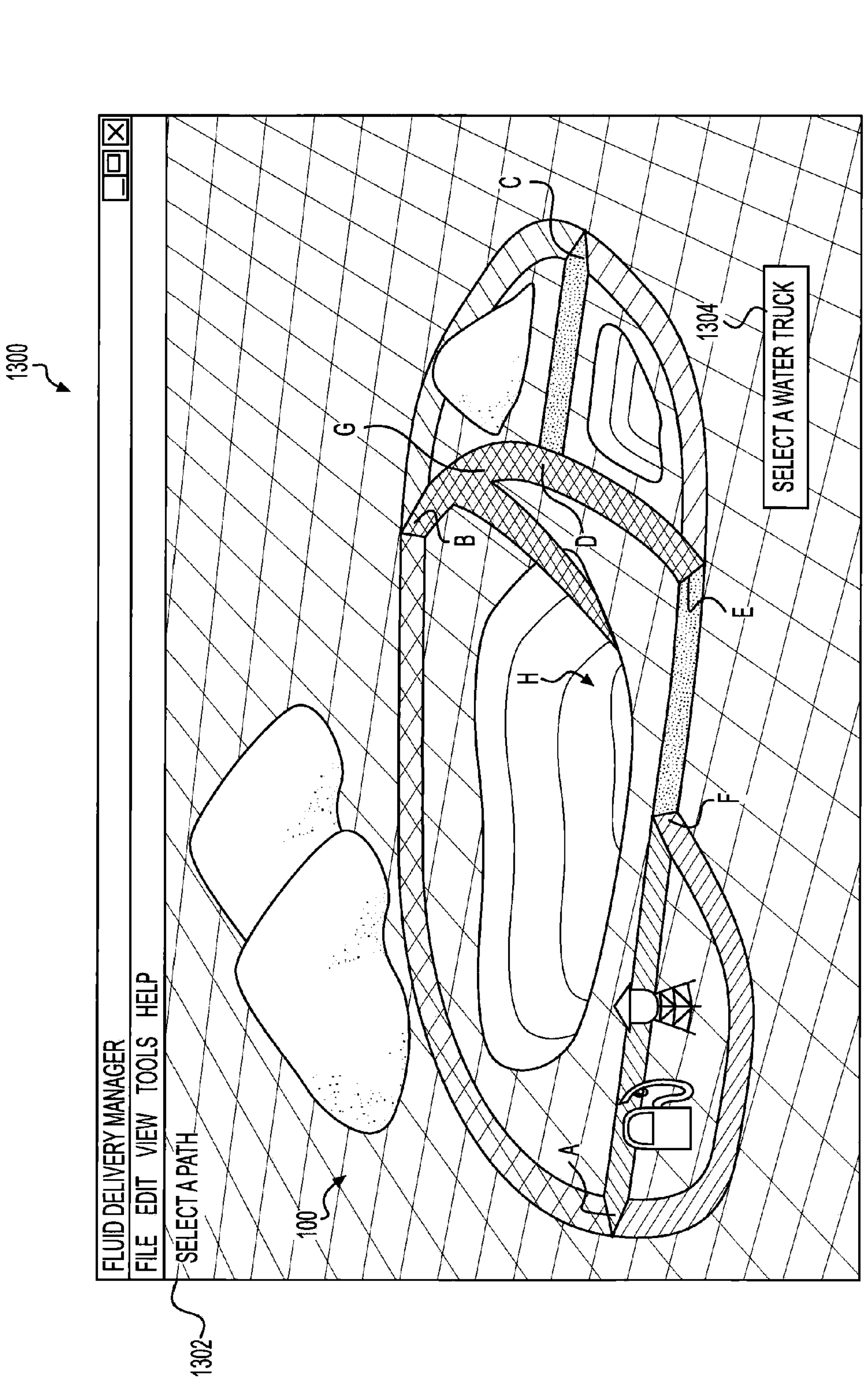
FIG. 13 is a representation of an exemplary fluid delivery management application, consistent with the disclosed embodiments.

FIG. 13 shows a graphical user interface (GUI) of a fluid delivery management application 1300 executed by fluid delivery controller 372, consistent with the disclosed embodiments. In one embodiment, application 1300 may assist the worksite administrator in scheduling, planning, or otherwise configuring a fluid delivery missions.

As shown in FIG. 13, application 1300 may include a route selection interface 1302 including a view of worksite 100 and the available paths on worksite 100. In one embodiment, the displayed paths may be visually distinguished to indicate their moisture levels, based on the moisture status information 522 associated with the segments in the path. For example, as shown, the paths may be colored (e.g., red, yellow, green, blue), shaded, hatched, highlighted or otherwise visually distinguished to indicate their associated moisture levels. In other embodiments, application 1300 may provide other information about the paths, such as their respective priority information 508, actual fluid level information 514, desired fluid level information 516, fluid delivery requirement information 518, modified fluid delivery requirement information 520, and/or other fluid status information 506 associated with the paths.

Using an input device associated with user interface system 358—such as a keyboard, mouse, or touchscreen—the worksite administrator may select a sequence of paths to create a route for a fluid delivery mission. In one embodiment, the administrator may select the route based on the displayed indication of the moisture statuses of the paths (e.g., coloring, shading, hatching, highlighting, etc.), and/or based on other displayed information relating to the paths. In certain embodiments, as the worksite administrator selects the paths to create a route, application 1300 may provide a recommendation the next path in the sequence, based on the variety of factors discussed above. For example, upon the worksite administrator selecting path segment A-B, application 1300 may recommend path segment B-D or B-C, depending on the priority information 508, moisture status information 522, traffic information 420, machine loading information 422, and/or zoning information 424 associated with the paths. After selecting a desired route for the mission, the worksite administrator may select an option 1304 to choose a fluid delivery machine 106 to dispatch on the mission.

Figure 14:
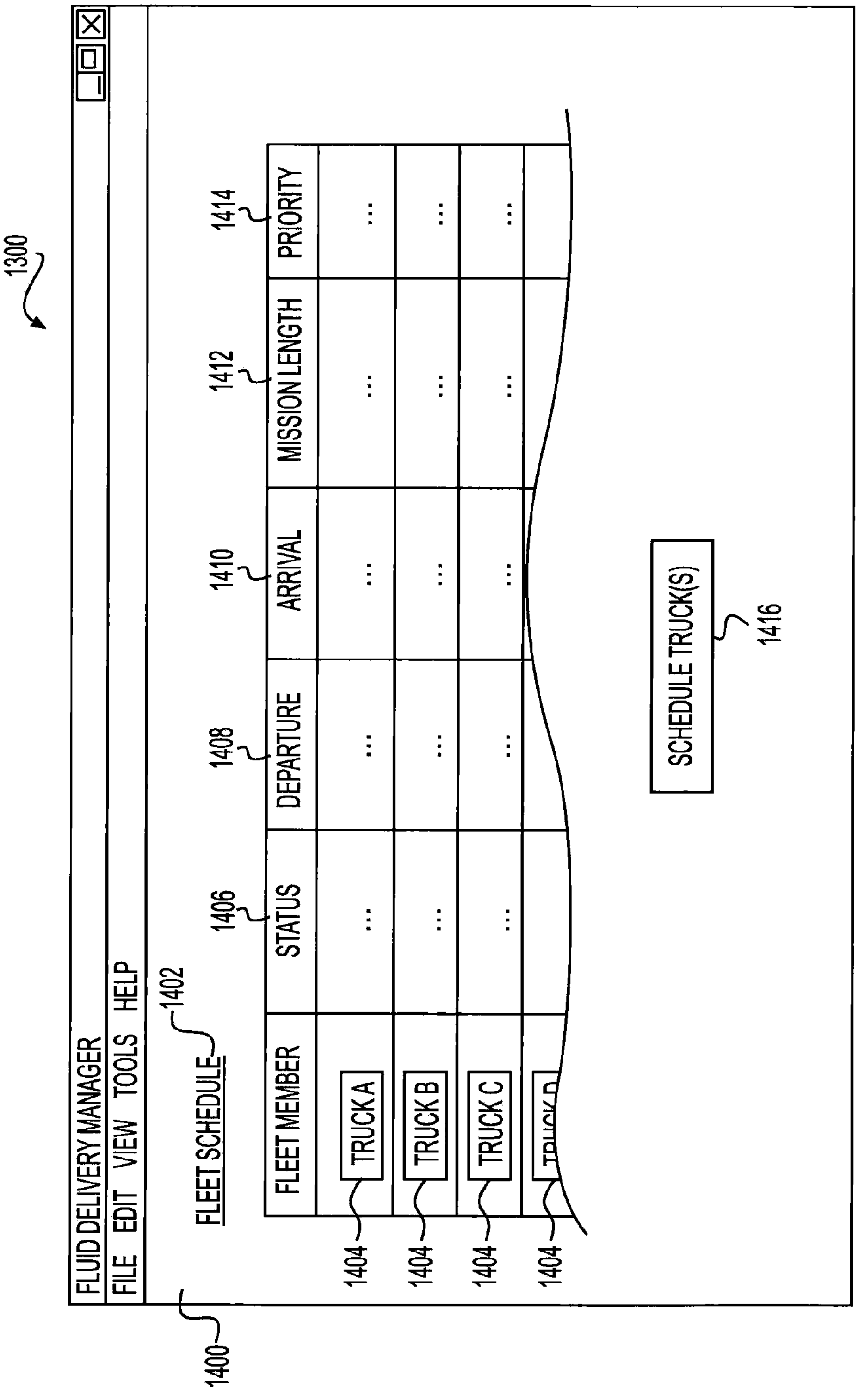
FIG. 14 is another representation of the fluid delivery management application, consistent with the disclosed embodiments.

FIG. 14 shows an exemplary fluid delivery machine fleet view 1400 of application 1300, consistent with the disclosed embodiments. As shown, view 1400 may include a fluid delivery machine scheduling tool 1402 allowing the worksite administrator to choose fluid delivery machines 106 in the fleet for the fluid delivery mission. For example, scheduling tool 1402 may include user interface elements 1404—such as buttons, text input boxes, or drop-down menus—allowing the worksite administrator to select a desired fluid delivery machine 106 for the mission.

In certain embodiments, scheduling tool 1402 may recommend a fluid delivery machine 1402 for the mission. For example, scheduling tool 1402 may recommend a fluid delivery machine 106, such as by highlighting, coloring, or otherwise visually distinguishing the user interface element 1404 associated with the recommended fluid delivery machine 106. In one embodiment, the recommendation process may be similar to the process described above in connection with step 812 of FIG. 8.

As shown in FIG. 14, scheduling tool 1402 may also display status information 1406, departure information 1408, arrival information 1410, mission length information 1412, and priority information 1414 for the fluid delivery machines 106 in the fleet. Such information may assist the worksite administrator in selecting a fluid delivery machine for the mission. In addition, scheduling tool 1402 may include a scheduling option 1416, such as a button, allowing the user to assign the selected fluid delivery machine 106 to the mission. In one embodiment, selection of scheduling option 1416 may cause scheduling tool 1402 to generate mission instructions 900 and to dispatch the selected fluid delivery machine 106, as respectively discussed above in connection with steps 816 and 820 of FIG. 8.

Network 308 may include any network that provides two-way communication between mobile machines 102, fluid delivery machines 106, worksite control facility 112, and/or any other entities associated with worksite 100. For example, network 308 may include a wireless networking platform, such as a satellite communication system. Alternatively and/or additionally, network 308 may include one or more broadband communication platforms appropriate for communicatively coupling the entities of worksite 100 such as, for example, cellular, Bluetooth, microwave, radio, infrared point-to-point wireless, point-to-multipoint wireless, multipoint-to-multipoint wireless, or any other appropriate communication platform for networking a number of components. Although network 308 is illustrated as a wireless communication network, it is contemplated that network 308 may include wireline networks such as, for example, Ethernet, fiber optic, waveguide, or any other type of wired communication network.

INDUSTRIAL APPLICABILITY

The disclosed embodiments may be applicable to any environment in which it is desirable to deliver fluid to an area under varying conditions. For example, as described above, the disclosed embodiments may apply to a mobile fluid delivery vehicle for delivering fluid to a worksite—such as a mining, excavation, or material stockpile—to control dust conditions under varying environmental and operational conditions. Aside from dust control applications, the disclosed fluid delivery processes may be used to maintain roads or other surfaces in good repair. For example, providing moisture to road surfaces in appropriate amounts may help bind the road surface and resist wear from traffic. Moreover, the disclosed processes may be used to compact the work surface in preparation for cutting, grading, compacting, or other excavation operations.

In addition, the disclosed embodiments may advantageously provide for efficient scheduling, dispatching, and routing of fluid delivery machines to treat a worksite with fluid. By providing a system for automatically analyzing the fluid delivery requirements of various paths on the worksite in view of a variety of environmental parameters, operational parameters, surface characteristics, and/or other monitored factors, the fluid delivery machines may be automatically dispatched as needed to provide efficient treatment of the worksite. In addition, fluid delivery resources, such as water and fuel, may be conserved. It will be apparent to those skilled in the art that various modifications and variations can be made to the methods and systems of the present disclosure. Other embodiments of the method and system will be apparent to those skilled in the art from consideration of the specification and practice of the method and system disclosed herein. For example, in other embodiments, one or more of mobile machines 102 may function as worksite control facility 112 by performing one or more of the functions discussed above as being performed by worksite control facility 112. In addition, mobile machines 102 may be configured to perform at least some aspects of processes 700 and 800, respectively discussed above in connection with FIGS. 7 and 8. In addition, one or more mobile machines 102 or fluid delivery machines 106 may be configured to execute application 1300, enabling a machine operator to act as the worksite administrator from the field. Accordingly, it is intended that the specification and examples be considered as exemplary only, with a true scope of the disclosure being indicated by the following claims and their equivalents.

What is claimed is:

1. A mobile fluid delivery system for delivering fluid to a site using one or more mobile fluid delivery machines, the system comprising:
- a site computing system comprising mission instructions identifying a sequence of path segments on the site and corresponding fluid delivery amounts allocated to the path segments; and
- a mobile fluid delivery machine comprising:
  - a tank storing fluid;
  - at least one spray head configured to spray the stored fluid onto the site based on a fluid delivery command received from an operator of the mobile fluid delivery machine;
  - an operator interface receiving input from the operator indicative of the fluid delivery command;
  - a display device;
  - a communication device receiving fluid delivery mission instructions from the site computing system;
  - a location device that determines the location of the mobile fluid delivery machine on the site;
  - a fluid delivery system comprising a controller and memory storing computer program instructions that the controller executes to:
    - determine whether the location of the fluid delivery machine corresponds to a path segment of the sequence;
    - identify the fluid delivery amount allocated to that path segment based on the mission instructions when it is determined that the location of the fluid delivery machine corresponds to a path segment in the sequence
    - determine an actual amount of fluid delivered to the path segment based on the fluid delivery command received from the operator; and
    - control the display device to display a representation of a comparison of the actual fluid delivery amount to the identified fluid delivery amount allocated to the path segment based on the mission instructions.

2. The mobile fluid delivery system of claim 1, further comprising a speed sensor configured to sense a travel speed of the fluid delivery machine, wherein the fluid delivery system is further configured to determine a fluid delivery rate based on the travel speed of the fluid delivery machine and on the fluid delivery amount allocated to the path segment.

3. The mobile fluid delivery system of claim 1, wherein the fluid delivery system is further configured to provide at least one of an audible or visual warning to the operator when the actual fluid delivery differs from the fluid delivery allocated to the path segment based on the mission instructions by more than a threshold.

4. The mobile fluid delivery system of claim 1, further comprising a navigation system configured to control the mobile fluid delivery machine to travel the sequence of path segments.

5. The mobile fluid delivery system of claim 1, wherein the fluid delivery system is further configured to:
- monitor actual amounts of fluid delivered to the segments in the sequence during the fluid delivery mission; and
- transmit, via the communication device, a fluid delivery mission report indicating the actual amounts of fluid delivered to the segments during the fluid delivery mission.

6. The mobile fluid delivery system of claim 1, wherein the fluid delivery system is further configured to cause the display device to display a map of the site indicating the sequence of path segments.

7. A mobile fluid delivery machine for delivering fluid to a site, comprising:
- a tank storing fluid;
- at least one spray head configured to spray the stored fluid onto the site based on a fluid delivery command received from an operator of the mobile fluid delivery machine;
- an operator interface receiving input from the operator indicative of the fluid delivery command;
- a display device;
- a communication device receiving fluid delivery mission instructions from a site computing system, the mission instructions identifying a sequence of path segments on the site and corresponding fluid delivery allocated to the path segments;
- a location device that determines a location of the mobile fluid delivery machine on the site;
- a speed sensor configured to sense a travel speed of the mobile fluid delivery machine; and
- a fluid delivery system comprising a controller and a memory storing computer program instructions that the controller executes to:
  - control a rate at which the fluid is sprayed from the at least one spray head to the path segments based on the travel speed of the mobile fluid delivery machine and on the operator's fluid delivery command;
  - determine fluid delivery allocated to the path segments based on the location of the mobile fluid delivery machine and the mission instructions;
  - determine actual delivery of the machine corresponding to the fluid delivery command received from the operator;
  - compare the actual fluid delivery to the allocated fluid delivery; and
  - control the display device to display a representation of the comparison.

8. The mobile fluid delivery system of claim 7, further comprising a navigation system configured to control the mobile fluid delivery machine to travel the sequence of path segments.

* * * * *